(12) United States Patent
Choi et al.

(10) Patent No.: US 9,608,791 B2
(45) Date of Patent: *Mar. 28, 2017

(54) MOBILE COMMUNICATION SYSTEM AND CHANNEL TRANSMISSION/RECEPTION METHOD THEREOF

(71) Applicant: Samsung Electronics Co., Ltd., Suwon-si, Gyeonggi-do (KR)

(72) Inventors: Seung Hoon Choi, Suwon-si (KR); Joon Young Cho, Suwon-si (KR); Jin Kyu Han, Seoul (KR); Young Bum Kim, Seoul (KR); Hyoung Ju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/131,399

(22) Filed: Apr. 18, 2016

(65) Prior Publication Data

US 2016/0234002 A1 Aug. 11, 2016

Related U.S. Application Data

(63) Continuation of application No. 14/684,830, filed on Apr. 13, 2015, now Pat. No. 9,320,038, which is a (Continued)

(30) Foreign Application Priority Data

Feb. 18, 2011 (KR) .................. 10-2011-0014816
Jun. 24, 2011 (KR) .................. 10-2011-0061512

(51) Int. Cl.
*H04W 72/04* (2009.01)
*H04L 5/00* (2006.01)
(Continued)

(52) U.S. Cl.
CPC .......... *H04L 5/0055* (2013.01); *H04L 1/1822* (2013.01); *H04L 1/1861* (2013.01);
(Continued)

(58) Field of Classification Search
None
See application file for complete search history.

(56) References Cited

U.S. PATENT DOCUMENTS 8,644,268 B2    2/2014  Zhang et al.
9,008,014 B2 *  4/2015  Choi ............... H04L 1/1861
                                                  370/329
(Continued)

FOREIGN PATENT DOCUMENTS

CN    101800633 A    8/2010
WO    2010/104957 A2  9/2010

OTHER PUBLICATIONS

3GPP TSG-RAN WG1 Meeting #54bis, R1-083730, "L1 control signaling with carrier aggregation in LTE-Advanced", Nokia, Nokia Siemens Networks, Sep. 29, 2008-Oct. 3, 2008.
(Continued)

*Primary Examiner* — Chi H Pham
*Assistant Examiner* — Shick Hom
(74) *Attorney, Agent, or Firm* — Jefferson IP Law, LLP

(57) ABSTRACT

A method and an apparatus for transmitting Hybrid Automatic Repeat reQuest (HARQ) Acknowledgement/Negative Acknowledgement (ACK/NACK) are provided. The HARQ ACK/NACK transmission method includes receiving a Physical Downlink Shared Channel (PDSCH) in a subframe of a first cell, identifying an ACK subframe for transmitting HARQ ACK/NACK corresponding to the PDSCH, and transmitting the HARQ ACK/NACK in the identified ACK subframe of a second cell.

14 Claims, 16 Drawing Sheets

Related U.S. Application Data continuation of application No. 13/399,420, filed on Feb. 17, 2012, now Pat. No. 9,008,014.

(51) Int. Cl.
*H04L 1/18* (2006.01)
*H04L 5/14* (2006.01)

(52) U.S. Cl.
CPC ............ *H04L 1/1893* (2013.01); *H04L 5/001* (2013.01); *H04L 5/0078* (2013.01); *H04L 5/1469* (2013.01); *H04W 72/042* (2013.01); *H04W 72/0446* (2013.01); *H04L 5/0023* (2013.01)

(56) References Cited

U.S. PATENT DOCUMENTS

| | | | |
|---|---|---|---|
| 9,166,747 B2* | 10/2015 | Moon | H04L 1/1861 |
| 9,320,038 B2* | 4/2016 | Choi | H04L 1/1861 |
| 2010/0281326 A1 | 11/2010 | Ahn et al. | |
| 2011/0243066 A1 | 10/2011 | Nazar et al. | |
| 2012/0020310 A1 | 1/2012 | Ji et al. | |
| 2012/0113827 A1 | 5/2012 | Yamada et al. | |
| 2012/0307775 A1 | 12/2012 | Chung et al. | |
| 2013/0064200 A1* | 3/2013 | Takeda | H04L 5/0016 370/329 |

OTHER PUBLICATIONS

3GPP TSG RAN WG1 #57bis, R1-092785, "Design of DL Control Channel for LTE-A with Carrier Aggregation", CATT, RITT, Potevio, Jun. 29, 2009-Jul. 3, 2009.

* cited by examiner

MOBILE COMMUNICATION SYSTEM AND CHANNEL TRANSMISSION/RECEPTION METHOD THEREOF

PRIORITY

This application is a continuation application of a prior application Ser. No. 14/684,830, filed on Apr. 13, 2015, and has issued as U.S. Pat. No. 9,320,038 on Apr. 19, 2016, which is a continuation of a prior application Ser. No. 13/399,420, filed on Feb. 17, 2012, which has issued as U.S. Pat. No. 9,008,014 on Apr. 14, 2015, and claimed the benefit under 35 U.S.C. §119(a) of a Korean patent application filed on Feb. 18, 2011 in the Korean Intellectual Property Office and assigned Serial number 10-2011-0014816, and of a Korean patent application filed on Jun. 24, 2011 in the Korean Intellectual Property Office and assigned Serial number 10-2011-0061512, the entire disclosure of each of which is hereby incorporated by reference.

BACKGROUND OF THE INVENTION

1. Field of the Invention

The present invention relates to a mobile communication system. More particularly, the present invention relates to a method for controlling transmission/reception timings of physical channels in a Time Division Duplex (TDD) communication system supporting carrier aggregation, particularly when the cells operate in different TDD configurations.

2. Description of the Related Art

A substantial amount of research is being conducted on the Orthogonal Frequency Division Multiple Access (OFDMA) and Single Carrier-Frequency Division Multiple Access (SC-FDMA) in the cellular communication field. Such multiple access technology is used to allocate and manage time-frequency resources for data transmission and/or control information transmission to and from multiple users without overlapping from each other (i.e. orthogonally) so as to discriminate among the multiple users.

A significant feature of the cellular communication system is support for scalable bandwidth for providing high speed data service. For example, a Long Term Evolution (LTE) system can support various bandwidths (e.g., 20/15/5/3/1.4 Mhz). Meanwhile, a LTE-Advanced (LTE-A) system can support high data rate transmission over a wide bandwidth (e.g., up to 100 MHz) for a single UE using a Carrier Aggregation (CA) technique. Mobile carriers can provide their services by selecting one of the available bandwidths, and the User Equipment (UE) can operate with various capabilities of a minimum 1.4 MHz bandwidth up to 20 MHz bandwidth.

In order to support the high data rate transmission, the LTE-A system requires the bandwidth wider than that of the LTE system while preserving backward compatibility to the legacy systems for supporting the LTE UEs.

For the backward compatibility, the system bandwidth of the LTE-A system is divided into a plurality of subbands or Component Carriers (CCs) that can be used for transmission/reception of data with LTE UEs and aggregated for the high data rate transmission of the LTE-A system with the transmission/reception process of the legacy LTE system per Component Carrier.

Each Component Carrier or cell can be categorized into one of a primary cell and a secondary cell according to its usage or significance. From the view point of the UE, only one primary cell exists with other secondary cells. In such an LTE-A system, the uplink control channel can be transmitted in the primary cell while uplink data channel can be transmitted in both the primary and secondary cells.

Typically, the scheduling information for the data transmitted on the Component Carriers is transmitted to the UE in Downlink Control Information (DCI). The DCI can be configured in various formats. That is, the DCI is generated in a different DCI format according to whether scheduling information is of uplink or downlink, whether the DCI is compact DCI, whether spatial multiplexing with multiple antennas is applied, and whether the DCI is the power control DCI. For example, the DCI format 1 for the control information about downlink data to which Multiple Input Multiple Output (MIMO) is not applied includes the following control information.

Resource allocation type 0/1 flag: The resource allocation type 0/1 flag notifies the UE of whether the resource allocation type is type 0 or type 1. Type 0 indicates resource allocation in a unit of Resource Block Group (RBG) in a bitmap method. In LTE and LTE-A systems, the basic scheduling unit is Resource Block (RB) representing a time resource and a frequency resource. An RBG includes a plurality of RBs and basic scheduling unit of type 0. Type 1 indicates allocation of a specific RB in RBG.

Resource block assignment: The resource block assignment information notifies the UE of an RB allocated for data transmission. At this time, the resource expressed according to the system bandwidth and resource allocation scheme is determined.

Modulation and coding scheme: The modulation and coding scheme notifies the UE of a modulation scheme and a coding rate applied for data transmission.

Hybrid Automatic Repeat reQuest (HARQ) process number: The HARQ process number information notifies the UE of a HARQ process number.

New data indicator: The new data indicator notifies the UE of whether the transmission is HARQ an initial transmission or a retransmission.

Redundancy version: The redundancy version information notifies the UE of a redundancy version of HARQ.

Transmit Power Control (TPC) command for Physical Uplink Control Channel (PUCCH): The TPC command for PUCCH notifies the UE of power a control command for a PUCCH as an uplink control channel.

The DCI for notifying the UE of these information elements is transmitted on the Physical Downlink Control Channel (PDCCH) through channel coding and modulation process.

FIG. 1 is a diagram illustrating a physical control channel allocation method according to the related art. That is, FIG. 1 an example in which the Evolved Node B (eNB) schedules downlink data for the UE in an LTE a system operating with two aggregated Component Carriers (i.e., CC#1 and CC#2).

Referring to FIG. 1, the eNB applies a DCI format defined in the legacy LTE to the DCI 101 transmitted on the Component Carrier #1 (CC#1) 109 and performs channel coding and interleaving 103 to generate a PDCCH 105 as a control information channel. Next, the eNB notifies the UE of the scheduling information about a Physical Downlink Shared Channel (PDSCH) 107 as data channel allocated to the UE on the CC#1 109.

The eNB applies a format defined in the legacy LTE to the DCI 111 transmitted on the Component Carrier #2 (CC#2) 119 and generates a PDCCH 115 as a control information channel. Next, the eNB notifies the UE of the scheduling information about PDSCH 117 as data channel allocated to the UE. The eNB may perform channel coding and interleaving 113 to generate the PDCCH 115 as the control information channel.

In case of applying the timing relationship among the physical channels transmitting a PDSCH and an UL Acknowledgement/Negative Acknowledgement (ACK/NACK) of an LTE TDD system to an LTE-A system supporting carrier aggregation, no addition operation is necessary to be defined except for the related timing relationship. Because LTE-A specifies that the UL control channel is transmitted only in the primary cell, if the cells are configured with different TDD UL-DL configurations, it is necessary to define the time relationship of the PDSCH transmission cross-carrier-scheduled with PDCCHs of individual cells and uplink HARQ ACK/NACK of the primary cell.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an improved mobile communication system and channel transmission/reception method thereof.

In accordance with an aspect of the present invention, a Hybrid Automatic Repeat reQuest (HARQ) Acknowledgement/Negative Acknowledgement (ACK/NACK) transmission method of a terminal is provided. The method includes receiving a Physical Downlink Shared Channel (PDSCH) in a subframe of a first cell, identifying an ACK subframe for transmitting HARQ ACK/NACK corresponding to the PDSCH, and transmitting the HARQ ACK/NACK in the identified ACK subframe of a second cell.

In accordance with another aspect of the present invention, a terminal for transmitting a Hybrid Automatic Repeat reQuest (HARQ) Acknowledgement/Negative Acknowledgement (ACK/NACK) is provided. The terminal includes a receiver which receives a Physical Downlink Shared Channel (PDSCH) in a subframe of a first cell, a timing controller which identifies an ACK subframe for transmitting HARQ ACK/NACK corresponding to the PDSCH, and a transmitter which transmits the HARQ ACK/NACK in the identified ACK subframe of a second cell.

In accordance with another aspect of the present invention, a Hybrid Automatic Repeat reQuest (HARQ) Acknowledgement/Negative Acknowledgement (ACK/NACK) reception method of a base station is provided. The method includes transmitting a Physical Downlink Shared Channel (PDSCH) in a transmission subframe of a first cell, identifying an ACK subframe for receiving HARQ ACK/NACK corresponding to the PDSCH, and receiving the HARQ ACK/NACK in the identified ACK subframe of a second cell.

In accordance with another aspect of the present invention, a base station for receiving a Hybrid Automatic Repeat reQuest (HARQ) Acknowledgement/Negative Acknowledgement (ACK/NACK) is provided. The base station includes a transmitter which transmits a Physical Downlink Shared Channel (PDSCH) in a transmission subframe of a first cell, a timing controller which identifies an ACK subframe for receiving HARQ ACK/NACK corresponding to the PDSCH, and a receiver which receives the HARQ ACK/NACK in the identified ACK subframe of a second cell.

In accordance with another aspect of the present invention, a method for cross carrier scheduling of a base station is provided. The method includes transmitting information relating to a carrier in a transmission subframe of a first cell, identifying a subframe for receiving of an indication as to reception of the information relating to the carrier, and receiving the indication as to reception of the information relating to the carrier in the identified subframe of a second cell.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
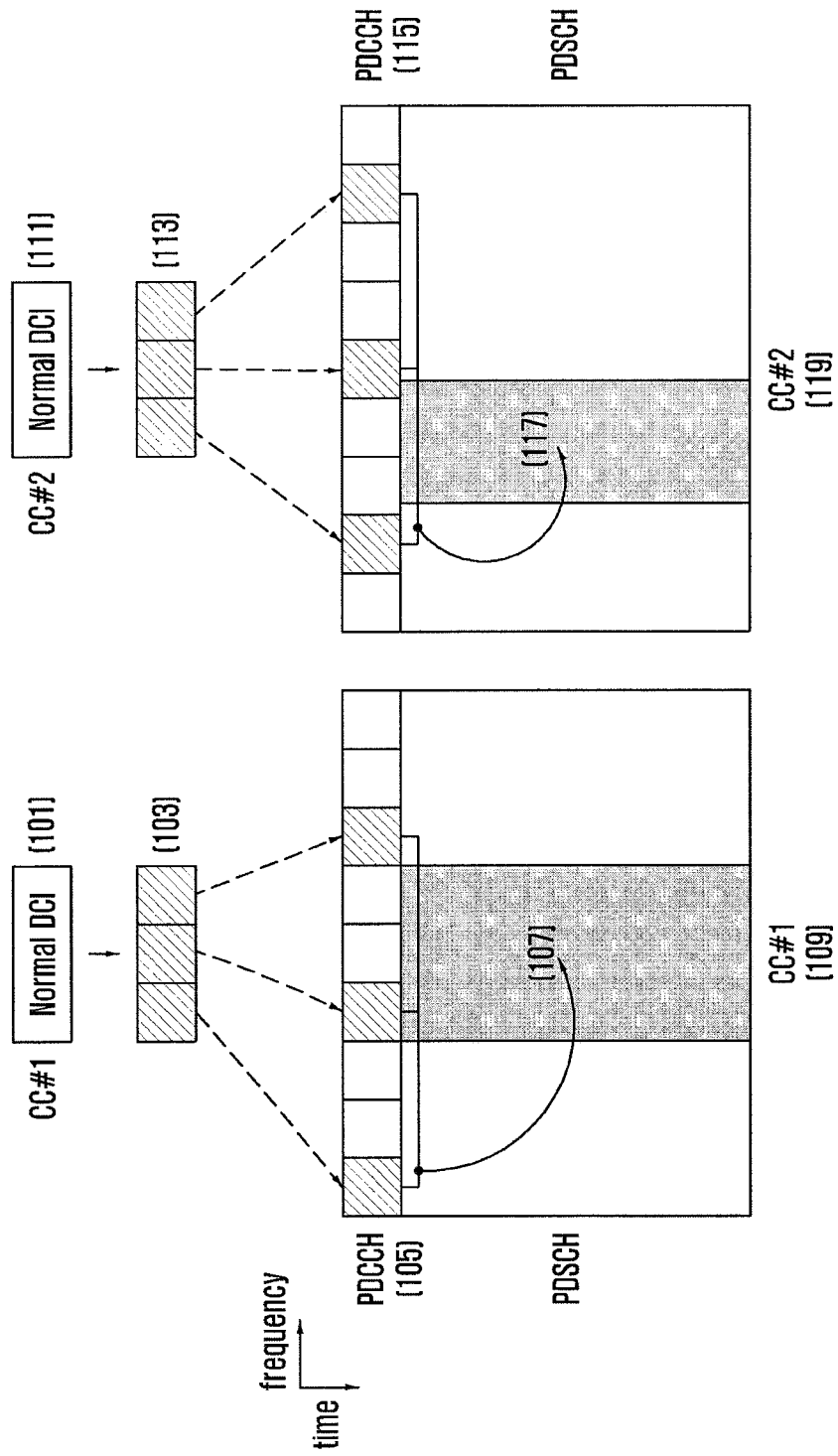
FIG. 1 is a diagram illustrating a physical control channel allocation method according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to a Long Term Evolution Advanced (LTE-A) system supporting carrier aggregation, it will be understood by those skilled in the art that the subject matter of the present invention can be applied to other communication systems having the similar technical background and channel format, with slight modification, without departing from the spirit and scope of the present invention. For example, the subject matter of the present invention can be applied to the multicarrier HSPA supporting carrier aggregation.

Exemplary embodiments of the present invention involve defining a timing relationship of cross carrier-scheduled Physical Downlink Control Channel (PDCCH) and a Physical Downlink Shared Channel (PDSCH) in each cell and an Up-Link (UL) Hybrid Automatic Repeat reQuest (HARQ) Acknowledgement/Negative Acknowledgement (ACK/NACK) in the primary cell in a Time Division Duplex (TDD) wireless communication system providing broadband service with carrier aggregation, particularly when the TDD Up-Link (UL)—Down-Link (DL) configurations of the aggregated carrier differ among the cells and cross carrier scheduling is adopted.

In an LTE-A system supporting carrier aggregation, when the Component Carrier (CC) transmitting Downlink Control Information (DCI) for supporting data transmission and the Component Carrier for transmitting data scheduled by the DCI differ from each other, this is referred to as cross-carrier scheduling. The cross carrier scheduling can be applied for downlink data transmission and uplink data transmission, respectively.

In the LTE-A system supporting carrier aggregation, the data transmission and Downlink Control Information (DCI) transmission for supporting the data transmission are performed separately. However, in order to guarantee highly reliable reception performance of the UE, the DCI can be transmitted on a Component Carrier different from the Component Carrier for transmitting data. A description is made of this technique referred to as cross carrier scheduling hereinafter with reference to FIG. 2.

Figure 2:
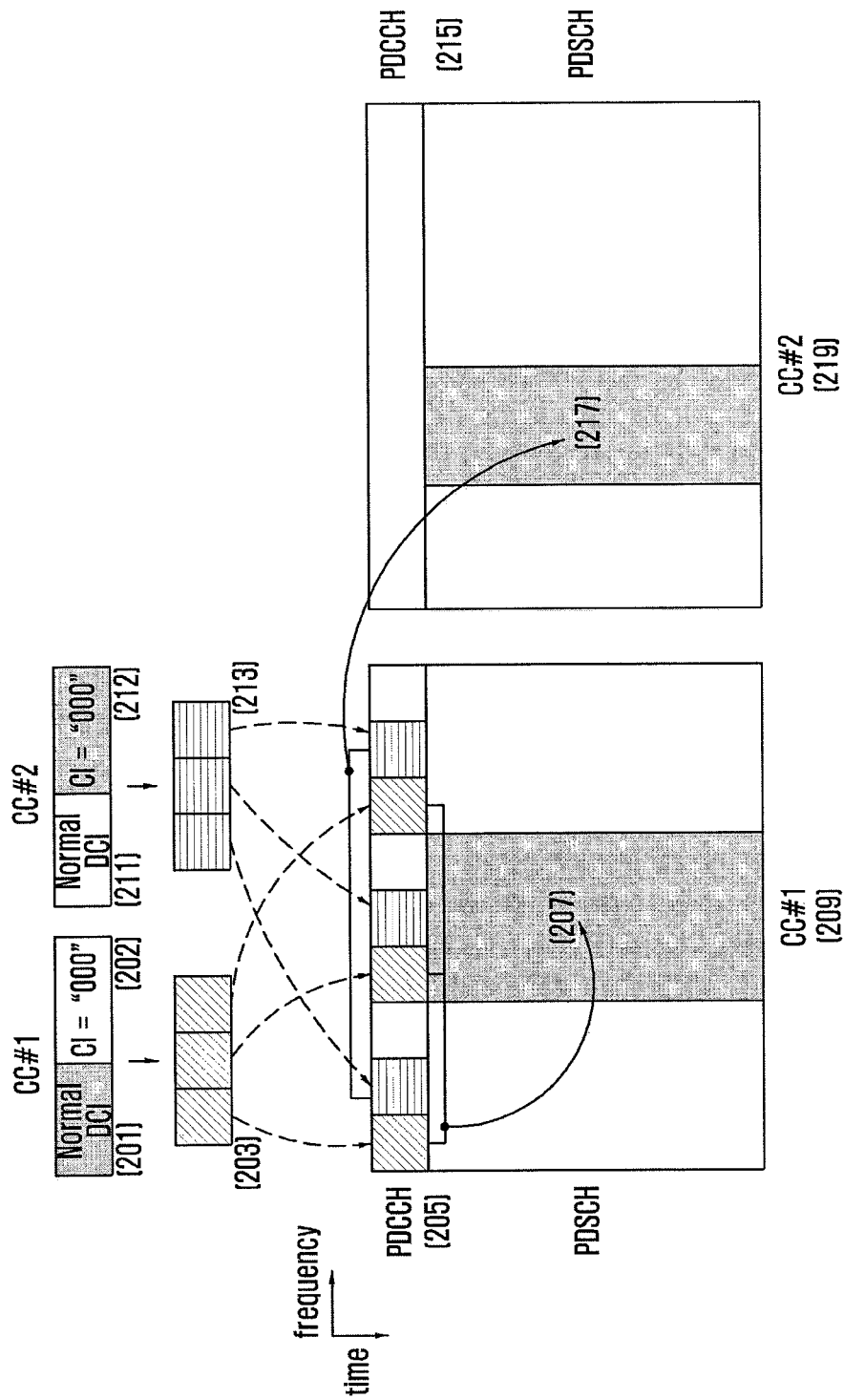
FIG. 2 is a diagram illustrating a principle of cross carrier scheduling according to an exemplary embodiment of the present invention.

FIG. 2 is a diagram illustrating a principle of cross carrier scheduling according to an exemplary embodiment of the present invention.

Referring to FIG. 2, FIG. 2 shows an exemplary scheduling of an LTE-A User Equipment (UE) operating on the aggregated Component Carriers CC#1 209 and CC#2 219 in downlink.

For example, FIG. 2 illustrates an exemplary embodiment of the present invention in which the downlink interference to CC#2 219 is greater than the downlink interference to CC#1 209 such that it is difficult to satisfy the DCI reception performance required for the eNB to transmit DCI for data transmission on the CC#2 219 to the UE. In such an exemplary embodiment of the present invention, the eNB can transmit the DCI through CC#1 209, and the UE has to know that the DCI carrying the scheduling information about the data to be transmitted on CC#2 is sent on the CC#1 209.

In case of data, it is possible to correct error through HARQ retransmission technique such that there is no problem for the eNB to transmit data on CC#2. However, the eNB has to transmit the Carrier Indicator (CI) indicating the Component Carrier of which scheduling information is carried in the DCI along with the DCI information informing of resource allocation and transmission format of the scheduled data. For example, CI=000 indicates scheduling information relating to CC#1 209 and CI=001 indicates scheduling information relating to CC#2 219.

Accordingly, the eNB configures an extended DCI by combining the DCI 201 indicating the resource allocation information and transmission format of the scheduled data 207 and the Carrier Indicator (CI) 202. After performing channel coding on the extended DCI as denoted by reference number 203, the eNB generates PDCCH through modulation and interleaving thereon and then transmits the PDCCH as mapped to the PDCCH region 205 of CC#1. Next, the eNB configures the extended DCI by combining the DCI 211 indicating the resource allocation information and transmission format of the scheduled data 217 and the CI 212. The eNB performs channel coding on the extended DCI as denoted by reference number 213 and generates by performing modulation and interleaving thereon and transmits the PDCCH as mapped to the PDCCH region 205 of CC#1. For example, the eNB performs channel coding on the extended DCI as denoted by reference number 213 and generates by performing modulation and interleaving thereon and transmits the PDCCH as mapped to the PDCCH region 205 of CC#1 rather than to the PDCCH region 215 of CC#2 219.

In a TDD system, the downlink and uplink share the same frequency and are discriminated from each other in a time domain. In an LTE TDD mode, the downlink and uplink signals are discriminated from each other per subframe. For example, in LTE, a subframe has the length of 1 ms, and 10 subframes form a radio frame.

According to the traffic loads in uplink and downlink, the uplink/downlink subframes are assigned symmetrically in time domain. Also, the more subframes can be assigned for downlink or uplink.

TABLE 1

| Uplink-downlink configuration | Subframe number |   |   |   |   |   |   |   |   |   |
|---|---|---|---|---|---|---|---|---|---|---|
|  | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Table 1 shows the TDD UL-DL configurations defined in an LTE standard. In Table 1, 'D' denotes the subframe configured for downlink transmission, and 'U' denotes the subframe configured for uplink transmission. 'S' denotes the Special subframe that includes a Downlink Pilot Time Slot (DwPTS), a Guard Period (GP), and an Uplink Pilot Time Slot (UpPTS).

The DwPTS can be used for transmitting control information in downlink like a normal subframe. The DwPTS may even be used for transmitting control information downlink data if the DwPTS is elongated long enough according to the configuration of the special subframe. The GP is a period for switching from downlink to uplink and the GP's length is determined according to the network configuration. The UpPTS is used for transmitting UE's Sounding Reference Signal (SRS) for uplink channel state estimation or Random Access Channel (RACH) for UE's random access.

For example, referring to Table 1, the TDD UL-DL configuration #6, subframes #0, #5, and #9 are configured for downlink data and control information transmission, subframes #2, #3, #4, #7, and #8 are configured for uplink data and control information transmission. The special subframes #1 and #6 can be used for control information or data transmission in downlink and SRS or RACH in uplink.

In the TDD system, because the downlink or uplink transmission is allowed for a specific time duration, it is necessary to define a detailed timing relationship between uplink and downlink physical channels correlated such as a control channel for data scheduling, a data channel to be scheduled, and a HARQ ACK/NACK channel corresponding to the data channel.

The uplink/downlink timing relationship between the Physical Downlink Shared Channel (PDSCH) as a downlink data transmission channel and the Physical Uplink Control Channel (PUCCH) as a physical channel for transmitting uplink HARQ ACK/NACK corresponding to the PDSCH or Physical Uplink Shared Channel (PUSCH).

If PDSCH is received from the eNB in $(n-k)^{th}$ subframe, the UE sends uplink HARQ ACK/NACK for the PDSCH in $n^{th}$ uplink subframe. Here, k denotes an element of a set K which is defined as illustrated in Table 2.

TABLE 2

| UL-DL Configuration | Subframe n |   |   |   |   |   |   |   |   |   |
|---|---|---|---|---|---|---|---|---|---|---|
|  | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 3:
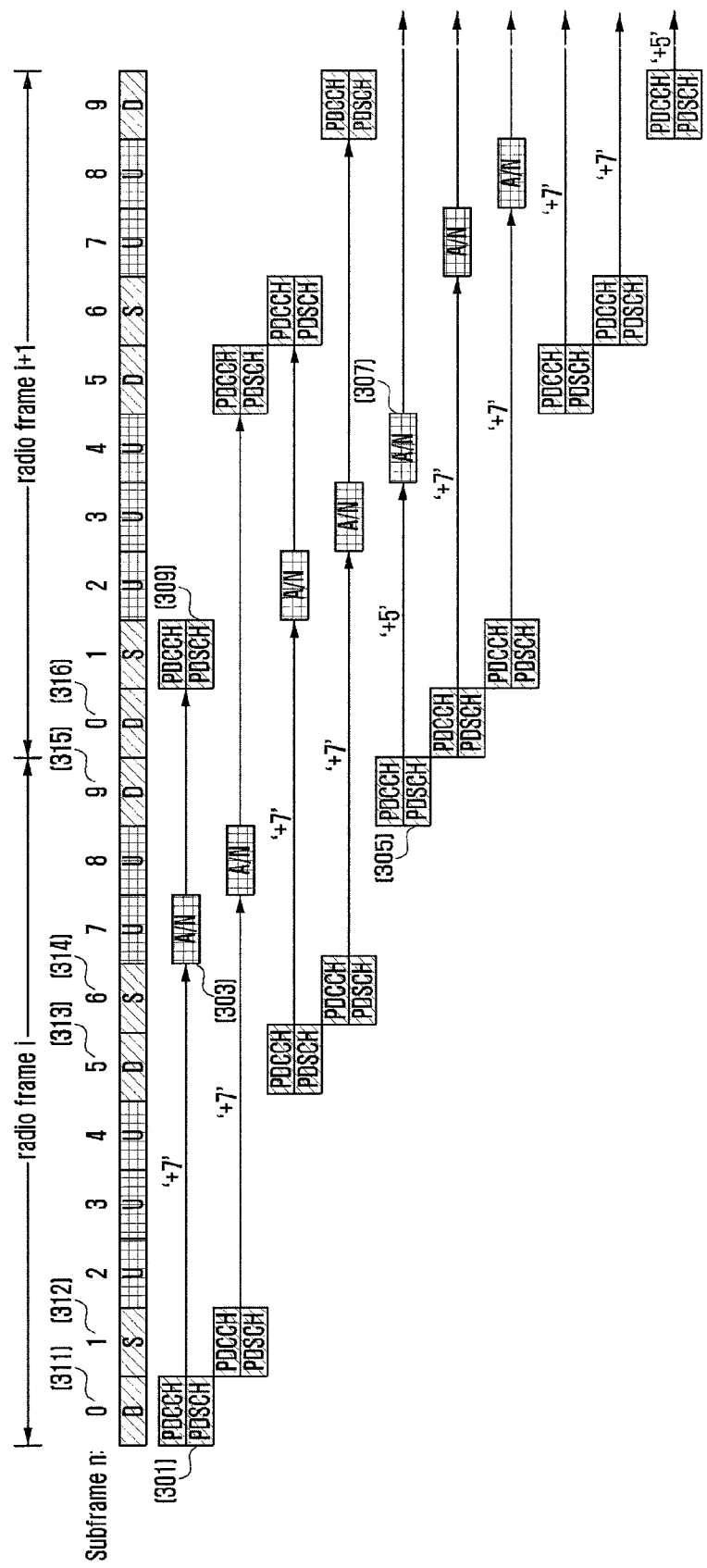
FIG. 3 is a diagram illustrating a principle of transmitting an uplink Hybrid Automatic Repeat reQuest (HARQ) Acknowledgement/Negative Acknowledgement (ACK/NACK) in a method according to an exemplary embodiment of the present invention.

FIG. 3 is a diagram illustrating a principle of transmitting an uplink Hybrid Automatic Repeat reQuest (HARQ) Acknowledgement/Negative Acknowledgement (ACK/NACK) in the method according to an exemplary embodiment of the present invention.

FIG. 3 shows which frame is used for transmitting the uplink HARQ ACK/NACK corresponding to the PDSCH transmitted in downlink or special subframe in TDD UL-DL configuration #6 according to the definition in Table 2. For example, the UE transmits HARQ ACK/NACK 303 in the subframe #7 of $i^{th}$ radio frame in response to the PDSCH 301 transmitted by the eNB in the subframe #0 of the radio frame. At this time, the DCI including the scheduling information about the PDSCH 301 is transmitted in the PDCCH of the same subframe carrying the PDSCH 301. In another example, the UE transmits the uplink HARQ ACK/NACK 307 corresponding to the PDSCH 305, which is transmitted by the eNB in the subframe #9 of the $i^{th}$ radio subframe, in the subframe #4 of the $(i+1)^{th}$ radio frame. Likewise, the DCI including the scheduling information about PDSCH 305 is transmitted through PDCCH of the same subframe carrying the PDSCH 305.

In the LTE system, an asynchronous HARQ scheme having unfixed e data retransmission time point. That is, when HARQ NACK feedback is received from the UE in response to the data of HARQ initial transmission, the eNB determines the HARQ retransmission time point freely according to the scheduling operation. The UE decodes the received data and buffers the erroneous HARQ data to be combined with next HARQ retransmission data. In order to maintain the reception buffer capacity to a certain limit, the maximum number of downlink HARQ processes is defined per TDD UL-DL configuration as shown in table 3. For example, one HARQ process maps to one subframe in time domain.

TABLE 3

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Referring to the exemplary embodiment of the present invention illustrated in FIG. 3, the UE decodes the PDSCH 301 transmitted by the eNB in the subframe #0 of $i^{th}$ radio frame. If the decoding result is erroneous, the UE transmits an HARQ NACK 303 in the subframe #7 of $i^{th}$ subframe.

Upon receipt of the HARQ NACK, the eNB transmits PDSCH 309 including the retransmission data corresponding to PDSCH 301 along with PDCCH. FIG. 3 illustrates an exemplary embodiment in which the maximum number of downlink HARQ processes is set to 6 according to TDD UL-DL configuration #6 of table 3 such that the retransmission data is transmitted in the subframe #1 of $(i+1)^{th}$ radio frame. That is, there are 6 downlink HARQ processes 311, 312, 313, 314, 315, and 316 between the initial transmission PDSCH 301 and retransmission PDSCH 309.

According to an exemplary embodiment of the present invention, the Component Carrier for transmitting DCI is referred to as a 'first Component Carrier' or 'first cell' while the Component Carrier for transmitting the data scheduled by the DCI is referred to as a 'second Component Carrier' or 'second cell' for convenience purpose.

In an LTE-A system supporting carrier aggregation, when the aggregated carriers are not contiguous in a given frequency band, the TDD UL-DL configuration can be done per cell according to the system operation scenario. For example, the first Component Carrier or the first cell can use symmetrical uplink/downlink subframe allocation while the second Component Carrier or the second cell allocates more subframes for downlink than uplink to expand the downlink capacity. In another example, the first Component Carrier or the first cell can adopts a TDD UL-DL configuration for maintaining a Time Division Synchronous Code Division Multiple Access (TD-SCDMA) system by taking notice of the compatibility of TD-SCDMA as a legacy 3G TDD system. In this way, it is possible to solve an interference problem between the TD-SCDMA and LTE TDD systems. Meanwhile, the second Component Carrier or the second cell can operate with a TDD UL-DL configuration according to the traffic load without additional restriction. Here, the primary cell is the first Component Carrier or the first cell, and the secondary cell can be the first Component Carrier (or the first cell) or the second Component Carrier (or the second cell). That is, the primary cell and a specific secondary cell can transmit PDCCH for cross carrier scheduling while the remaining secondary cells except for the specific secondary cell can transmit the PDSCH scheduled by the PDCCH of the primary cell or the specific secondary cell.

A description is made of the method for defining a timing relationship between the PDSCH transmission cross-carrier scheduled with the PDCCH of each cell in association with downlink data transmission and the uplink HARQ ACK/NACK in the primary cell. In an exemplary embodiment of the present invention, if the PDCCH is received in the subframe of the first cell according to the cross carrier scheduling for selecting subframe to transmit uplink HARQ ACK/NACK of the primary cell, the UE receives the PDSCH through the subframe of the second cell which is indicated by the carrier indicator of the PDCCH, selects the subframe for transmitting HARQ ACK/NACK according to the received PDSCH, and transmits the HARQ ACK/NACK in the selected subframe. According to an exemplary embodiment of the present invention, the eNB transmits PDCCH in the first cell and PDSCH in the second cell to the UE according to the cross carrier scheduling, identifies the subframe for receiving HARQ ACK/NACK corresponding to the PDSCH, and receives the HARQ ACK/NACK from the UE in the identified subframe. Exemplary embodiments of the present invention can be applied with a number of Component Carriers for providing broadband service through carrier or cell aggregation without restrictions.

Figure 4:
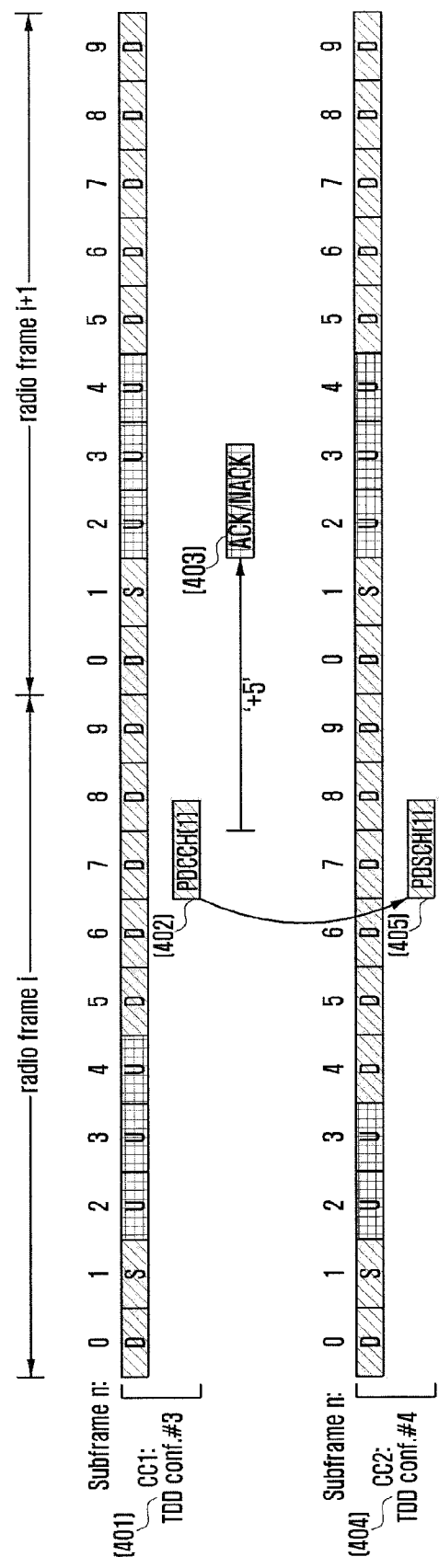
FIG. 4 is a diagram illustrating a physical control channel allocated in a mobile communication system operating with two aggregated Component Carriers (CCs) according to an exemplary embodiment of the present invention.

FIG. 4 is a diagram illustrating a physical control channel allocated in a mobile communication system operating with two aggregated Component Carriers (CCs) according to an exemplary embodiment of the present invention.

FIG. 4 shows an exemplary case of TDD system operating with two Component Carriers aggregated: the Component Carrier CC1 401 representing the first cell as the primary cell operating in TDD UL-DL configuration #3 and the Component Carrier CC2 404 representing the second cell as a secondary cell operating in TDD UL-DL configuration #4. Although the description is directed to the case where only one secondary cell is configured with the Component Carrier CC2, exemplary embodiments of the present invention are not limited thereto. That is, the method of the exemplary embodiment of the present invention can be applied to the case in which a plurality of Component Carriers are configured to form the secondary cells. In addition, exemplary embodiments of the present invention can be applied to the case in which secondary cells are cross carrier scheduled. Also, exemplary embodiments of the present invention can be applied to the case in which the cells sharing the same TDD UL-DL configuration are grouped and the cross-carrier scheduling is applied only in the group. Furthermore, the exemplary embodiments of the present invention can be applied to the case of self-scheduling in which each cell performs scheduling PDSCH transmission on its own.

Referring to FIG. 4, the PDSCH scheduling on the Component Carrier CC1 401 as primary cell (i.e., non-cross carrier scheduling) may be identical with the scheduling in a legacy LTE TDD system. However, the operation for scheduling the PDSCH of the Component Carrier CC2 404 as a secondary cell through PDCCH of the Component Carrier CC1 as primary cell (i.e. cross carrier scheduling operation) is not defined in the legacy LTE standard. and Accordingly, it is necessary for the operation for scheduling the PDSCH of the Component Carrier CC2 as a secondary cell through PDCCH of the Component Carrier CC1 as the primary cell to be newly defined. In particular, it is necessary to define the timing relationship for transmitting the HARQ ACK/NACK for PDSCH of the secondary cell in the primary cell.

A brief description is made of the timing relationship between PDCCH carrying the cross carrier scheduling information and PDSCH scheduled by the scheduling. According to the exemplary embodiment of the present invention illustrated in FIG. 4, the eNB is supposed to transmit the PDCCH 402 for scheduling the PDSCH 405 of the secondary cell CC2 404 in the subframe #7 of $i^{th}$ radio frame configured as downlink subframe in the primary cell CC1 401. At this time, because the subframe of the secondary cell CC2 is configured as downlink subframe at the same time point, the eNB can perform downlink transmission in the corresponding subframe.

If the subframe of the secondary cell CC2 is configured as uplink subframe at the same time point, the eNB cannot perform downlink transmission in the corresponding subframe. In such a situation, the exemplary embodiment of the present invention proposes a method for performing the cross carrier scheduling of the PDCCH transmitted in the CC1 as the primary cell in the PDSCH of the next downlink subframe of the secondary cell which is arriving as soon as possible from the same time point.

In this case, the UE receives the PDSCH 405 in the subframe #7 of $i^{th}$ radio frame within the secondary cell CC2 404. The UE transmits HARQ ACK/NACK in the uplink subframe arriving as soon as possible after 4 subframes since the PDSCH transmission in the primary cell. Although the subframe #0 arrives after 4 frames in this embodiment, since the subframe #0 is a downlink subframe, the next uplink subframe arriving as soon as possible can be the subframe #2.

That is, the HARQ ACK/NACK 403 is transmitted in the subframe #2 which is the first uplink subframe after 4 subframes since the transmission of PDCCH 402 in the primary cell. If it is determined that the uplink HARQ ACK/NACK 403 received from the UE is NACK, the eNB retransmits the PDSCH 402. At this time, the eNB determines whether to apply the cross carrier scheduling again.

To sum up the UE operation according to an exemplary embodiment of the present invention, if the subframe carrying the PDCCH of the first cell and the subframe carrying the PDSCH of the secondary cell are downlink subframes, the UE transmits HARQ ACK/NACK in the uplink subframe of the primary cell after a predetermined number of subframes since the downlink subframes. In other words, if the PDSCH is received in the subframe transmitted at the subframe carrying the PDCCH, the UE transmits HARQ ACK/NACK in the uplink frame arriving first after 4 subframes since then.

Figure 5:
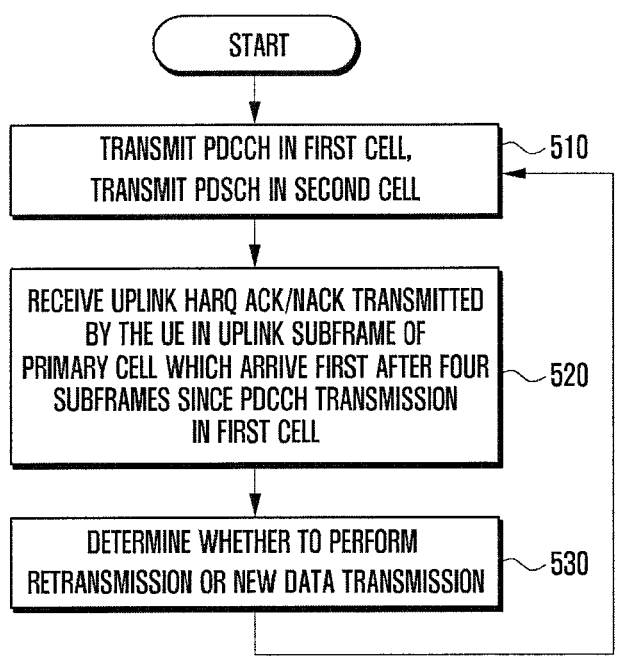
FIG. 5 is a flowchart illustrating an Evolved Node B (eNB) procedure for cross carrier scheduling according to an exemplary embodiment of the present invention.

FIG. 5 is a flowchart illustrating an Evolved Node B (eNB) procedure for cross carrier scheduling according to an exemplary embodiment of the present invention.

Referring to FIG. 5, the eNB generates and transmits PDCCH to the UE in the first cell and generates and transmits PDSCH in the second cell at step 510. Next, the eNB receives uplink HARQ ACK/NACK transmitted by the UE in the uplink subframe of the primary cell which arrives first after four subframes since the PDCCH transmission in the first cell at step 520.

The eNB determines whether the HARQ ACK/NACK received at step 520 is NACK at step 530. If the HARQ ACK/NACK is NACK, the eNB retransmits the PDSCH. Otherwise, if the HARQ ACK/NACK is ACK, the eNB transmits new PDSCH. Next, the eNB returns the procedure to step 510 to determine whether to perform PDSCH retransmission or PDCCH transmission for scheduling new PDSCH and then continues steps following step 510 as described above.

Figure 6:
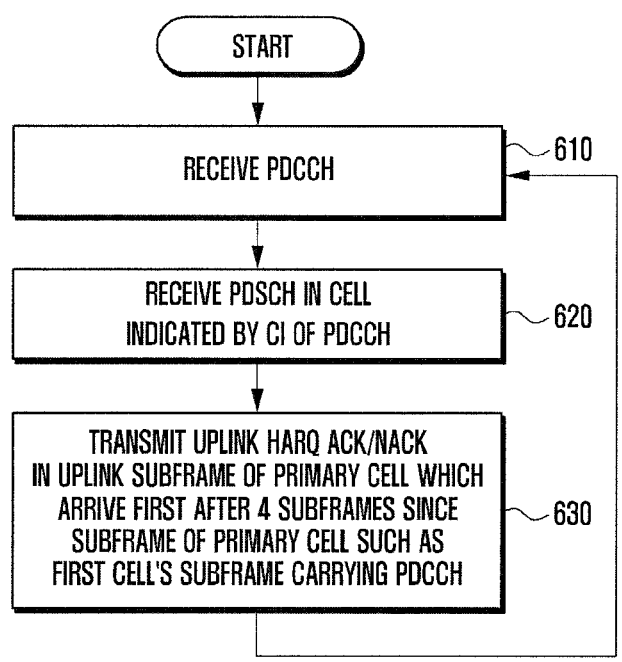
FIG. 6 is a flowchart illustrating an User Equipment (UE) procedure for cross carrier scheduling according to an exemplary embodiment of the present invention.

FIG. 6 is a flowchart illustrating an User Equipment (UE) procedure for cross carrier scheduling according to an exemplary embodiment of the present invention.

Referring to FIG. 6, the UE receives PDCCH from the eNB at step 610. The UE cannot be aware of time and Component Carrier on which the eNB transmits the PDCCH in advance. Accordingly, the UE attempts detecting PDCCH on the Component Carrier configured to perform decoding PDCCH thereon every subframe. The UE performs CRC check on the PDCCH with unique UE Identification (ID) allocated to itself.

If the PDCCH carries the scheduling information addressed to the UE, the UE receives PDSCH in the cell indicated by the Carrier Indicator (CI) included in the PDCCH at step 620. Next, the UE transmits HARQ ACK/NACK in the uplink subframe of the primary cell which appears first after 4 subframes since subframe in which the PDCCH has been received. The UE returns the procedure to step 610 and, if the HARQ ACK/NACK transmitted at step 630 is NACK, the UE prepares for receiving PDSCH retransmission. Otherwise, if the HARQ ACK/NACK transmitted at step 630 is ACK, the UE prepares for receiving a new PDSCH. At this time, if the HARQ ACK/NACKs of multiple cells including the primary cell are transmitted simultaneously, the UE multiplexes the HARQ ACK/NACKs. Finally, the UE transmits the multiplexed HARQ ACK/NACKs in the corresponding subframe.

Although the description is directed to the case in which, when the primary cell subframe carrying the PDCCH and the second cell subframe carrying PDSCH that are transmitted at the same time are all downlink subframes, the UE transmits HARQ ACK/NACK in primary cell uplink subframe after a predetermined number of subframes since then according to such an exemplary embodiment of the present invention, exemplary embodiments of the present invention are not limited thereto. For example, when the primary cell subframe carrying the PDCCH and the secondary cell subframe carrying the PDSCH that are transmitted are not identical with each other, the UE can transmit HARQ ACK/NACK in the primary cell uplink subframe arriving first after a predetermined number of subframes since the subframe in which PDSCH has been received.

Although the description is directed to the case of cross carrier scheduling (i.e. PDCCH transmission in the first cell and PDSCH transmission in the second cell) according to such an exemplary embodiment of the present invention, exemplary embodiments of the present invention are not limited thereto. For example, according to an exemplary embodiment of the present invention if the self-scheduling is performed (i.e. if PDCCH and PDSCH are transmitted in the same cell without configuration of CIF), then the UE can transmit HARQ ACK/NACK in the primary cell uplink subframe arriving first after a predetermined number of subframe since the subframe in which PDSCH has been received in a specific secondary cell. At this time, if the HARQ ACK/NACKs of multiple cells including the primary cell are transmitted simultaneously, the UE multiplexes the HARQ ACK/NACKs. Finally, the UE transmits the multiplexed HARQ ACK/NACKs in the corresponding subframe.

According to an exemplary embodiment of the present invention, there is a method for defining a timing relationship of PDSCH transmission in a secondary cell and uplink HARQ ACK/NACK in the primary cell when PDCCH related to the downlink data transmission of the secondary cell is transmitted through the primary cell in a TDD radio communication system.

Figure 7:
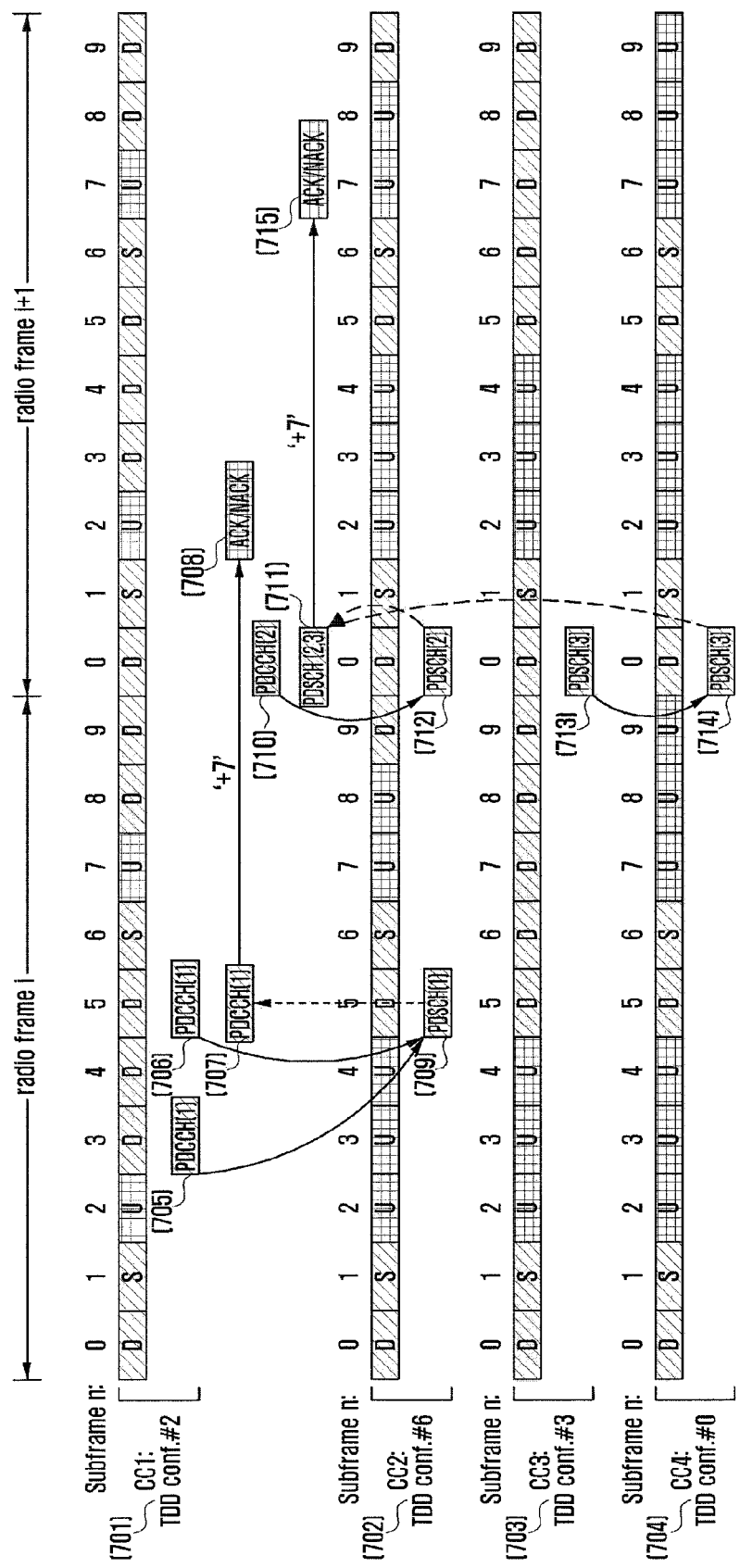
FIG. 7 is diagram illustrating a principle of a channel transmission/reception method according to an exemplary embodiment of the present invention.

FIG. 7 is diagram illustrating a principle of a channel transmission/reception method according to an exemplary embodiment of the present invention.

Referring to FIG. 7, exemplary embodiments of the present invention may relate to a TDD system operating with multiple Component Carriers aggregated. For example, the TDD system operating with multiple Component Carriers aggregated may include a Component Carrier CC1 701 as the primary cell operating in TDD UL-DL configuration #2, a Component Carrier CC2 702 as a secondary cell operating in TDD UL-DL configuration #6, a Component Carrier CC3 703 as a secondary cell operating in TDD UL-DL configuration #3, and a Component Carrier CC4 704 as a secondary cell operating in TDD UL-DL configuration #0. Although the description is directed to the an example in which three Component Carriers CC2, CC3, and CC4 are configured as secondary cells, exemplary embodiments of the present invention can be applied to other communication modes in which more than or less than 3 Component Carriers are configured. Exemplary embodiments also can be applied to the communication mode in which the cells sharing the same TDD UL-DL configuration are grouped and cross-carrier scheduled only in the group. Exemplary embodiments also can be applied to the case of self-scheduling in which each cell performs scheduling PDSCH transmission on its own.

Referring to FIG. 7, the operation of PDSCH scheduling on the Component Carrier CC1 701 as primary cell and the PDSCH scheduling on the Component Carrier CC3 703 as a secondary cell (i.e. non-cross carrier scheduling operation) may be identical with that of the legacy LTE TDD system. However, the operation for scheduling the PDSCH of the Component Carrier CC2 702 as secondary cell on the PDCCH of the Component Carrier CC1 701 of the primary cell, (i.e. cross carrier scheduling operation) is not defined for the legacy LTE system and thus necessary to be newly defined. Particularly, it is necessary to define the timing relationship for transmitting the HARQ ACK/NACK for the PDSCH of the secondary cells in the primary cell.

A brief description is made of the timing relationship between PDCCH carrying the cross carrier scheduling information and PDSCH scheduled by the scheduling information. Referring to FIG. 7, the eNB transmits PDSCH 706 for scheduling PDSCH of the secondary cell CC2 702 in the subframe #5 of $i^{th}$ radio frame which is configured as downlink subframe on the primary cell CC1 701. At this time, the subframe of the secondary cell CC2 702 which carries PDCCH 706 is configured as downlink subframe, the downlink transmission can be performed in the subframe of the secondary cell CC2 702.

Next, it is assumed that the eNB is supposed to transmit PDCCH 705 for scheduling PDSCH 713 of the secondary cell CC2 702 in the subframe #3 of $i^{th}$ radio frame which is configured as downlink subframe in the primary cell CC1 701. The subframe #3 of $i^{th}$ radio frame is the uplink subframe in the secondary cell CC2 702. Accordingly, the downlink transmission does not take place in the subframe of the secondary cell CC2 702. In this case, the eNB performs cross carrier scheduling on the PDCCH 709 in the downlink subframe #5 of the secondary cell which is arriving first since the PDCCH 705 is transmitted in subframe of the primary cell CC1 701.

In this case, if the PDSCH 709 is received in the subframe #5 of $i^{th}$ radio frame in the secondary cell CC2 702, the UE assumes that the PDSCH 707 is transmitted in the primary cell. Next, the UE transmits uplink HARQ ACK/NACK 708 in the subframe #2 of $(i+1)^{th}$ radio frame after 7 subframes since then according to the timing relationship of the TDD UL-DL configuration #2 as defined in Table 2. That is, when transmitting uplink HARQ ACK/NACK in response to the PDSCH received from the eNB, the UE abides by the rule defined for the legacy LTE TDD system according to the TDD UL-DL configuration applied to the primary cell for the timing relationship between PDSCH and HARQ ACK/NACK under the assumption that the PDSCH has been received in the same subframe of the primary cell.

Referring again to FIG. 7, the eNB transmits PDCCH 710 for scheduling PDSCH of the secondary cell CC2 702 in the subframe #0 of $(i+1)^{th}$ radio frame which is configured downlink subframe in the primary cell CC1 701 and assumes that PDCCH 713 for scheduling PDSCH 714 of the secondary cell CC4 704 in the same subframe of the same radio frame is transmitted in the secondary cell CC3 703. At this time, the subframes of the secondary cells CC2 702 and CC4 704 are configured as downlink subframes at the same time such that it is possible to perform downlink transmission in the corresponding subframes.

The UE receives PDSCH 712 and PDSCH 714 in the subframe #0 of $(i+1)^{th}$ radio frame through the secondary cells CC2 702 and CC4 704. The UE assumes that the PDSCH 711 is transmitted through the primary cell CC1 701 and transmits uplink HARQ ACK/NACK 715 in the subframe #7 of $(i+1)^{th}$ radio frame after 7 subframes since then according to the timing relationship of the TDD UL-DL configuration #2 defined in Table 2. That is, when transmitting uplink HARQ ACK/NACK in response to the PDSCH received from the eNB, the UE assumes that the PDSCH has been received in the same subframe of the primary cell and applies the rule defined for the legacy LTE TDD system to the timing relationship between PDSCH and HARQ ACK/NACK according to the TDD UL-DL configuration applied to the primary cell.

To sum up the UE operation according to an exemplary embodiment of the present invention, if it is assumed that the PDSCHs of the primary and secondary cells are transmitted in the same subframe, the UE applies the rule defined for the legacy LTE TDD system according to the TDD UL-DL configuration applied to the primary cell. At this time, if the HARQ ACK/NACKs of multiple cells including the primary cell are transmitted simultaneously, the UE multiplexes the HARQ ACK/NACKs. Finally, the UE transmits the multiplexed HARQ ACK/NACKs in the corresponding subframe.

Although the description is directed to the cross carrier scheduling (i.e. the case in which the PDCCH is transmitted in the first cell while PDSCH is transmitted in the second cell), exemplary embodiments of the present invention are not limited thereto. For example, if the self-scheduling is performed (i.e. if PDCCH and PDSCH are transmitted in the same cell without configuration of CIF), then the UE assumes that the PDCCH is transmitted in the primary cell of the same subframe as the subframe carrying PDSCH of a specific secondary cell. The UE can transmit HARQ ACK/NACK in the uplink subframe of the primary cell with the rule defined for the legacy LTE TDD according to the TDD UL-DL configuration applied to the primary cell. At this time, if the HARQ ACK/NACKs of multiple cells including the primary cell are transmitted simultaneously, the UE multiplexes the HARQ ACK/NACKs. Finally, the UE transmits the multiplexed HARQ ACK/NACKs in the corresponding subframe.

According to exemplary embodiments of the present invention, there is a method for defining, when the PDCCH related to the downlink data transmission of a second secondary cell is transmitted in a first secondary cell which is not the primary cell, the timing relationship between the PDSCH transmission of the second secondary cell and the uplink HARQ ACK/NACK transmission of the primary cell. A description is made of this with reference to FIG. 8.

Figure 8:
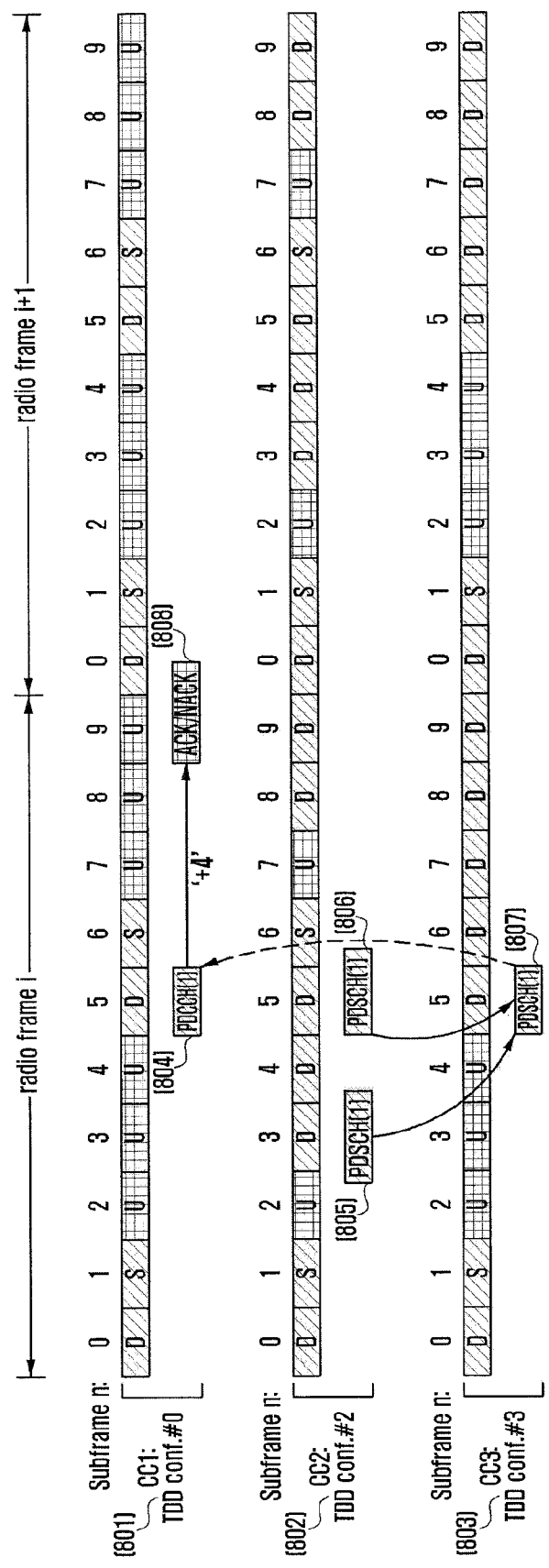
FIG. 8 is a diagram illustrating a principle of a channel transmission/reception method according to an exemplary embodiment of the present invention.

FIG. 8 is a diagram illustrating a principle of a channel transmission/reception method according to an exemplary embodiment of the present invention.

Referring to FIG. 8, an exemplary embodiment of the present invention includes a TDD system operating with 3 Component Carriers aggregated: the Component Carrier CC1 801 as the primary cell operating in TDD UL-DL configuration #0, the Component Carrier CC2 802 as a secondary cell operating in TDD UL-DL configuration #2, and the Component Carrier CC3 803 as a secondary cell operating in TDD UL-DL configuration #3. Although the description is directed to a communication mode where two Component Carriers CC2 802 and CC3 803 are configured as secondary cells, the exemplary embodiment of the present invention can be applied to other communication modes in which more than or less than 2 Component Carriers are configured. Exemplary embodiments of the present invention also can be applied to the communication mode in which the cells sharing the same TDD UL-DL configuration are grouped and cross-carrier scheduled only in the group. Exemplary embodiments of the present invention also can be applied to the case of self-scheduling in which each cell performs scheduling PDSCH on its own.

Referring to FIG. 8, the operation of PDSCH scheduling on the Component Carrier CC2 802 as secondary cell (i.e. the non-cross carrier scheduling operation) similar to that of the legacy LTE TDD system.

However, the operation for scheduling the PDSCH of the Component Carrier CC3 803 on the PDCCH of the Component Carrier CC2 802 as a secondary cell (i.e. cross carrier scheduling operation) is not defined for the legacy LTE system and thus it is necessary for the cross carrier scheduling operation to be newly defined. Particularly, it is necessary to define the timing relationship of the HARQ ACK/NACK transmissions for the PDSCHs of the secondary cells in the primary cell.

A brief description is made of the timing relationship between PDCCH carrying the cross carrier scheduling information and PDSCH scheduled by the scheduling information. In FIG. 8, the eNB is supposed to transmit PDCCH 806 for scheduling PDSCH of the secondary cell CC3 803 in the subframe #5 of $i^{th}$ radio frame which is configured as downlink subframe in the secondary cell CC2 802. In the above example, because the subframe of the secondary cell CC3 803 is configured as downlink subframe at the same time point, the downlink transmission is possible in the corresponding subframe. However, if the eNB transmits PDCCH 805 for scheduling PDSCH 807 of the secondary cell CC3 803 in the subframe #3 of $i^{th}$ radio frame which is configured as downlink subframe in the secondary cell CC2 802, the PDCCH transmitted on the CC2 802 as the secondary cell is cross-carrier scheduling the PDSCH 807 in the downlink subframe #5 of the secondary cell CC3 803 which arrives first since then.

If the PDSCH 807 is received in the subframe #5 of the $i^{th}$ radio frame of the secondary cell CC3 803, the UE assumes that the PDSCH 804 is transmitted in the subframe of the primary cell at the same time point as the subframe carrying the PDSCH in the secondary cell. The UE transmits uplink HARQ ACK/NACK 808 in the subframe #9 of the $i^{th}$ radio frame after 4 subframes according to the time relationship of the TDD UL-DL configuration #0 defined in Table 2. That is, if it is assumed that the PDSCH is received in the same subframe of the primary cell, the UE receives PDSCH from the eNB and abides by the rule defined for the legacy LTE TDD system according to the TDD UL-DL configuration applied to the primary cell for the timing relationship between PDSCH and HARQ ACK/NACK, when transmitting uplink HARQ ACK/NACK, under the assumption that the PDSCH has been received in the same subframe of the primary cell.

To sum up the UE operation according to an exemplary embodiment of the present invention, if the PDCCH carrying the cross carrier scheduling information is transmitted not in the primary cell but in the first secondary cell, and the PDSCH is transmitted in the primary cell of the same subframe as the subframe carrying the PDSCH of the second secondary cell, the UE applies the rule defined for the legacy LTE TDD system according to the TDD UL-DL configuration applied to the primary cell. At this time, if the HARQ ACK/NACKs of multiple cells including the primary cell are transmitted simultaneously, the UE multiplexes the HARQ ACK/NACKs. Finally, the UE transmits the multiplexed HARQ ACK/NACKs in the corresponding subframe.

Although the description is directed to an exemplary embodiment of the present invention relating to cross carrier scheduling in which PDSCH is transmitted in the first cell and PDSCH in the second cell, exemplary embodiments of the present invention are not limited thereto. If self-scheduling is performed according to exemplary embodiments of the present invention (i.e., if the PDSCH and PDSCH are transmitted in a cell without CIF configuration), then the UE assumes that the PDSCH is transmitted through the primary cell in the same subframe carrying the PDSCH of a specific secondary cell. The UE can transmit HARQ ACK/NACK in the uplink subframe of the primary cell with the rule defined for the legacy LTE TDD system according to the TDD UL-DL configuration applied to the primary cell. At this time, if the HARQ ACK/NACKs of multiple cells including the primary cell are transmitted simultaneously, the UE multiplexes the HARQ ACK/NACKs. Finally, the UE transmits the multiplexed HARQ ACK/NACKs in the corresponding subframe.

According to an exemplary embodiment of the present invention, there is a method for defining, when the PDCCH related to the downlink data transmission of a second secondary cell in a first secondary cell which is not primary cell, a timing relationship between PDSCH transmission of the second secondary cell and the uplink HARQ ACK/NACK transmission of the primary cell. A description is made of this with reference to FIG. 9.

Figure 9:
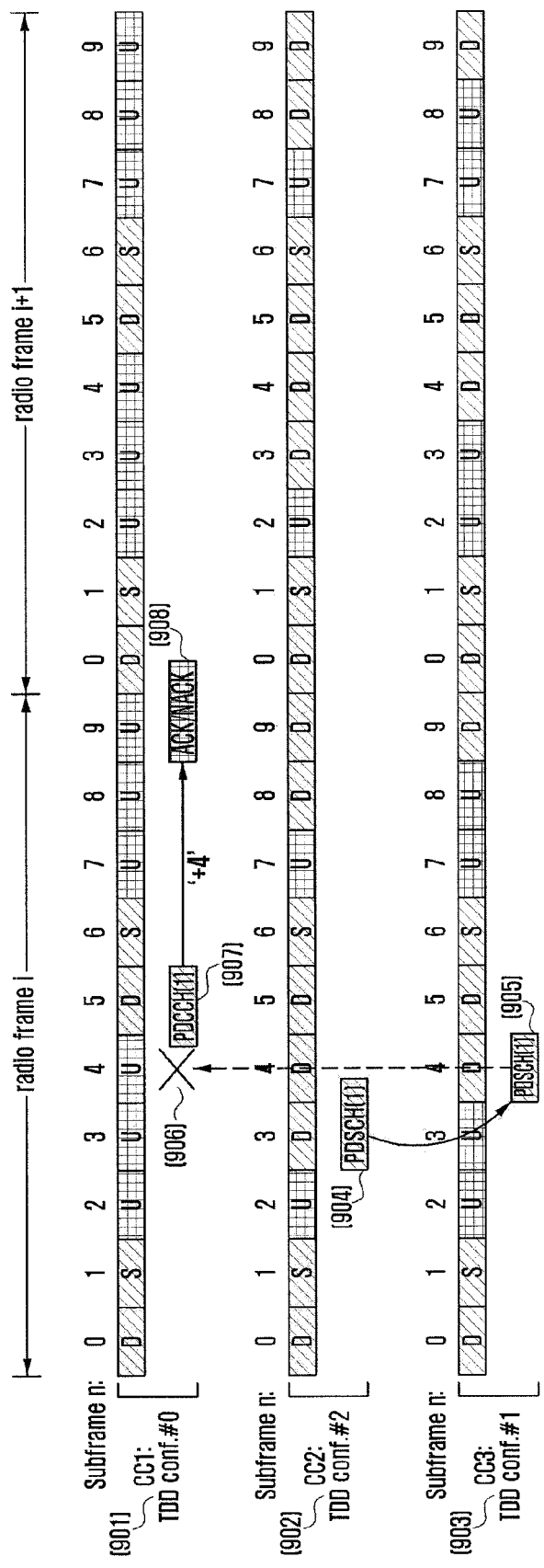
FIG. 9 is a diagram illustrating a principle of a channel transmission/reception method according to an exemplary embodiment of the present invention.

FIG. 9 is a diagram illustrating a principle of a channel transmission/reception method according to an exemplary embodiment of the present invention.

Referring to FIG. 9, an exemplary embodiment of the present invention includes a TDD system operating with 3 Component Carriers aggregated: the first Component Carrier CC1 as the primary cell operating in TDD UL-DL configuration #0, the second Component Carrier 902 as a secondary cell operating in TDD UL-DL configuration #2, and the third Component Carrier CC3 903 as a secondary cell operating in TDD UL-DL configuration #1. Although the description is directed to the communication mode in which two Component Carriers CC2 and CC3 are configured as secondary cells, exemplary embodiments of the present invention can be applied to other communication modes in which more than or less than 2 Component Carriers are configured. Exemplary embodiment of the present invention also can be applied to the communication mode where the cells sharing the same TDD UL-DL configuration are grouped and cross-carrier scheduled only in the group. Exemplary embodiments of the present invention also can be applied to the case of self-scheduling in which each cell performs scheduling PDSCH on its own.

Referring to FIG. 9, the operation of PDSCH scheduling on the Component Carrier CC2 902 as secondary cell (i.e. the non-cross carrier scheduling operation) may be similar to that of the legacy LTE TDD system.

However, the operation for scheduling the PDSCH of the Component Carrier CC3 903 on the PDCCH of the Component Carrier CC2 902 as a secondary cell (i.e. cross carrier scheduling operation) is not defined for the legacy LTE system and thus it is necessary for the operation of the cross carrier scheduling operation to be newly defined. Particularly, it is necessary to define the timing relationship of the HARQ ACK/NACK transmissions for the PDSCHs of the secondary cells in the primary cell.

A brief description is made of the timing relationship between PDCCH carrying the cross carrier scheduling information and PDSCH scheduled by the scheduling information.

Referring again to FIG. 9, the eNB transmits PDSCH 904 for scheduling PDSCH of the secondary cell CC3 903 in the subframe #3 of $i^{th}$ radio frame which is configured as downlink subframe of the secondary cell CC2. At this time, the subframe of the secondary cell CC 903 at the time point when PDSCH 904 is transmitted is configured as uplink subframe. Because the downlink transmission is impossible in the secondary cell CC3 903, the PDSCH 904 transmitted on CC2 902 as secondary cell is cross-carrier scheduling the PDSCH 905 in the downlink subframe #4 of the secondary cell CC3 903 arriving first since the time point when the PDCCH has been transmitted.

If the PDSCH 905 is received in the subframe #4 of the $i^{th}$ radio frame of the secondary cell CC3 903, the UE identifies the subframe of the primary cell at the time point when the PDSCH 905 is transmitted. If the subframe of the primary cell is uplink subframe 906, then the UE assumes that PDSCH 907 is transmitted in the downlink subframe #5 of the primary cell which is arriving first since the transmission of PDSCH 905.

According to the timing relationship of the TDD UL-DL configuration #0 defined in Table 2, the UE transmits uplink HARQ ACK/NACK 908 in the subframe #9 of $i^{th}$ radio frame after 4 subframes. That is, when transmitting the uplink HARQ ACK/NACK in response to the PDSCH received from the eNB, if the primary cell subframe, at the time point when the PDSCH is received, is uplink subframe, the UE assumes that PDSCH is received in the downlink subframe arriving first in the primary cell. Next, the UE applies the rule defined for legacy LTE TDD system to the timing relationship between PDSCH and HARQ ACK/NACK transmissions according to the TDD UL-DL configuration applied to the primary cell.

To sum up the UE operation according to an exemplary embodiment of the present invention, if the PDCCH carrying the cross carrier scheduling information is not transmitted in the primary cell but in the first secondary cell and if the subframe of the primary cell at the time point when the PDSCH is transmitted is uplink subframe in the PDSCH timing relationship of the second secondary cell, the UE assumes that the PDSCH is transmitted downlink subframe arriving first in the primary. The UE applies the rule defined for the legacy LTE TDD system according to the TDD UL-DL configuration applied to the primary cell. At this time, if the HARQ ACK/NACKs of multiple cells including the primary cell are transmitted simultaneously, the UE multiplexes the HARQ ACK/NACKs. Finally, the UE transmits the multiplexed HARQ ACK/NACKs in the corresponding subframe.

Although the description is directed to the exemplary cross carrier scheduling in which PDCCH is transmitted in the first cell and PDSCH in the second cell, exemplary embodiments of the present invention are not limited thereto. If self-scheduling is performed according to an exemplary embodiment of the present invention (i.e., if the PDSCH and PDSCH are transmitted in a cell without CIF configuration) then the UE assumes that the PDSCH is transmitted in the downlink subframe of the primary cell arriving first after the subframe carrying the PDSCH of a specific secondary cell. The UE can transmit HARQ ACK/NACK in the uplink subframe of the primary cell with the rule defined for the legacy LTE TDD system according to the TDD UL-DL configuration applied to the primary cell. At this time, if the HARQ ACK/NACKs of multiple cells including the primary cell are transmitted simultaneously, the UE multiplexes the HARQ ACK/NACKs. Finally, the UE transmits the multiplexed HARQ ACK/NACKs in the corresponding subframe.

Figure 10:
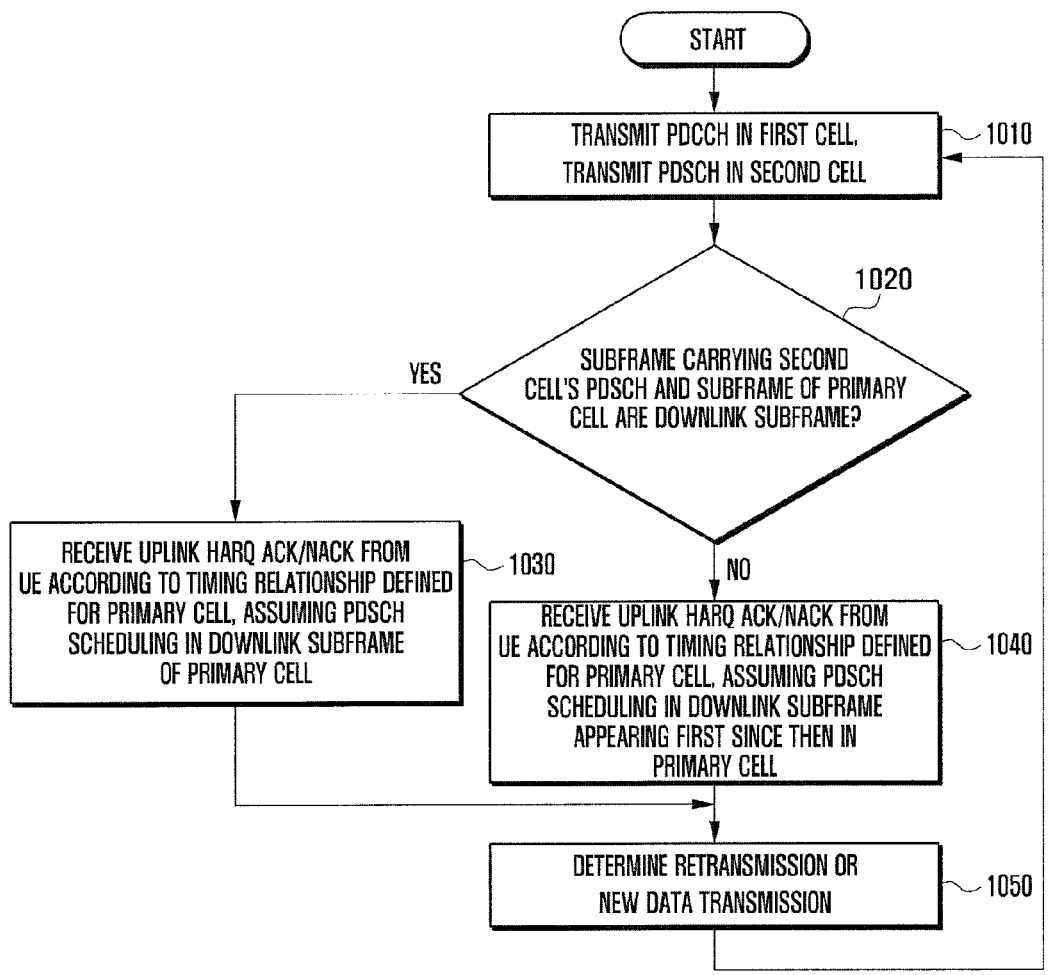
FIG. 10 is a flowchart illustrating an eNB procedure for cross carrier scheduling according to exemplary embodiments of the present invention.

FIG. 10 is a flowchart illustrating an eNB procedure for cross carrier scheduling according to exemplary embodiments of the present invention.

Referring to FIG. 10, the eNB generates and transmits PDCCH in the first cell and generates and transmits PDSCH in the second cell at step 1010. Next, the eNB determines whether the subframe of the primary cell which is transmitted at the same time as the subframe carrying the PDSCH in the second cell is downlink subframe at step 1020.

If the primary cell subframe is the downlink subframe, the eNB assumes that the PDSCH is scheduled in the downlink subframe of the primary cell at step 1030. Afterward, the eNB receives uplink HARQ ACK/NACK from the UE according to the timing relationship defined in the primary cell. Otherwise, if the primary cell subframe is not downlink subframe, the eNB assumes that the PDSCH is scheduled in the downlink subframe arriving first after the time point of PDSCH transmission in the primary cell at step 1040. Afterward, the eNB receives uplink HARQ ACK/NACK from the UE according to the timing relationship defined in the primary cell.

At step 1050, the eNB checks the HARQ ACK/NACK received at step 1030 or at step 1040. If the received HARQ ACK/NACK is NACK, the eNB performs retransmission of the PDSCH. Otherwise, if the received HARQ ACK/NACK is ACK, the eNB transmits new PDSCH. Afterward, the eNB returns the procedure to step 1010 and resumes the above described procedure with the determination on whether to retransmit the PDSCH or transmit PDCCH for new PDSCH scheduling.

Figure 11:
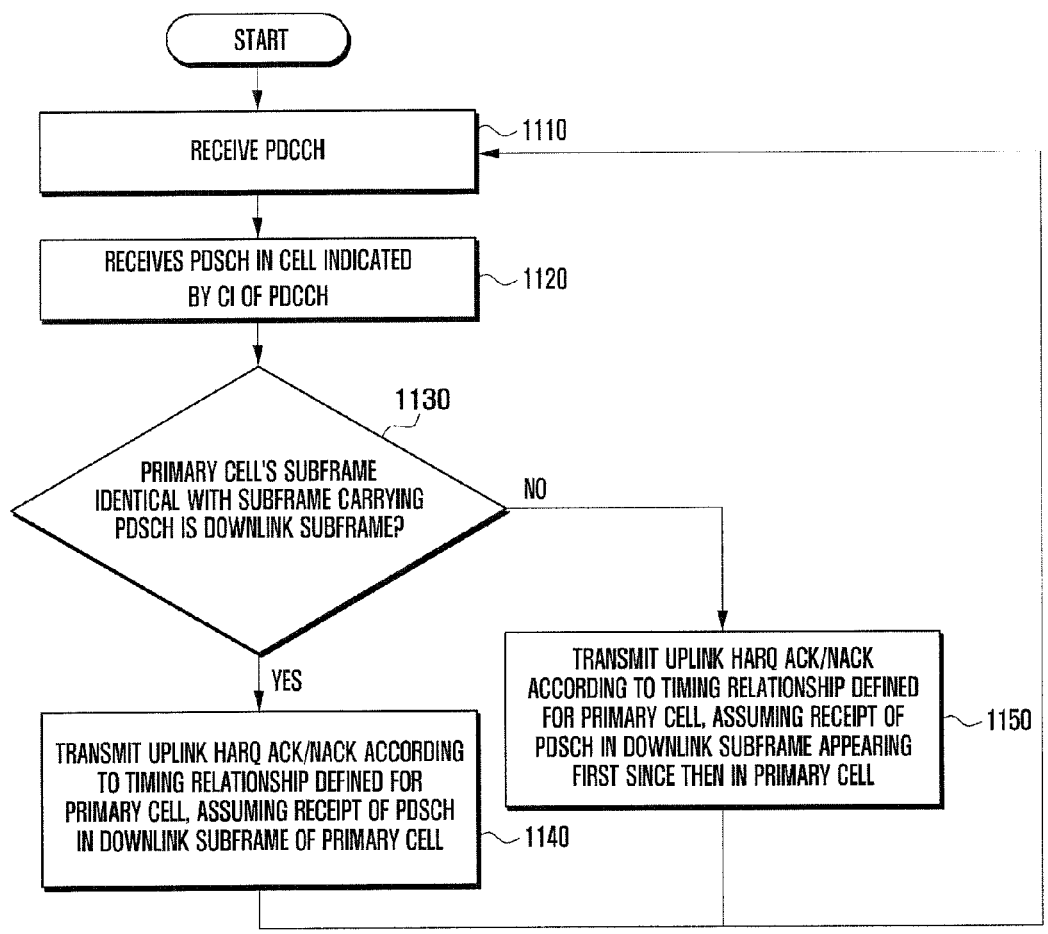
FIG. 11 is a flowchart illustrating an UE procedure for cross carrier scheduling according to exemplary embodiments of the present invention.

FIG. 11 is a flowchart illustrating an UE procedure for cross carrier scheduling according to exemplary embodiments of the present invention.

Referring to FIG. 11, the UE receives PDCCH from the eNB at step 1110. At this time, the eNB is not aware when the eNB transmit PDCCH on which Component Carrier. Accordingly, the UE attempts to detect PDCCH on the Component Carrier configured for decoding PDCCH every subframe. The UE performs CRC check with a unique UE ID allocated for PDCCH addressed to itself.

If the PDCCH carries the scheduling information address to the UE, the UE receives PDSCH in the cell indicated by the CI included in the PDCCH at step 1120. Next, the UE determines whether the primary cell subframe received at the same time as the subframe carrying the PDSCH is uplink subframe at step (1130.

If the primary cell subframe is downlink subframe, the UE assumes that the PDSCH is received in the downlink subframe of the primary cell at step 1140. Next, the UE transmits uplink HARQ ACK/NACK according to the timing relationship defined for the primary cell. If the primary cell subframe is not downlink subframe, the UE assumes that the PDSCH is received in the downlink subframe appearing first since then in the primary cell at step 1150. Next, the UE transmits uplink HARQ ACK/NACK according to the timing relationship defined for the primary cell. Afterward, the UE returns the procedure to step 1110 to prepare for receiving the PDSCH retransmission or new PDSCH according to the HARQ ACK/NACK transmitted at step 1140 or at step 1150. At this time, if the HARQ ACK/NACKs of multiple cells including the primary cell are transmitted simultaneously, the UE multiplexes the HARQ ACK/NACKs. Finally, the UE transmits the multiplexed HARQ ACK/NACKs in the corresponding subframe.

According to another exemplary embodiment of the present invention, there is a method for defining time relationship of PDSCH transmission in a secondary cell and HARQ ACK/NACK transmission in a certain cell not restricted to the primary cell when the PDCCH related to the downlink data transmission of the secondary cell is transmitted through the primary cell in a TDD radio communication system. Although PUCCH transmission is allowed in the primary cell of LTE-A, it is assumed in an exemplary embodiment that the PUCCH transmission is not limited to the primary cell but can be transmitted in a certain cell.

Figure 12:
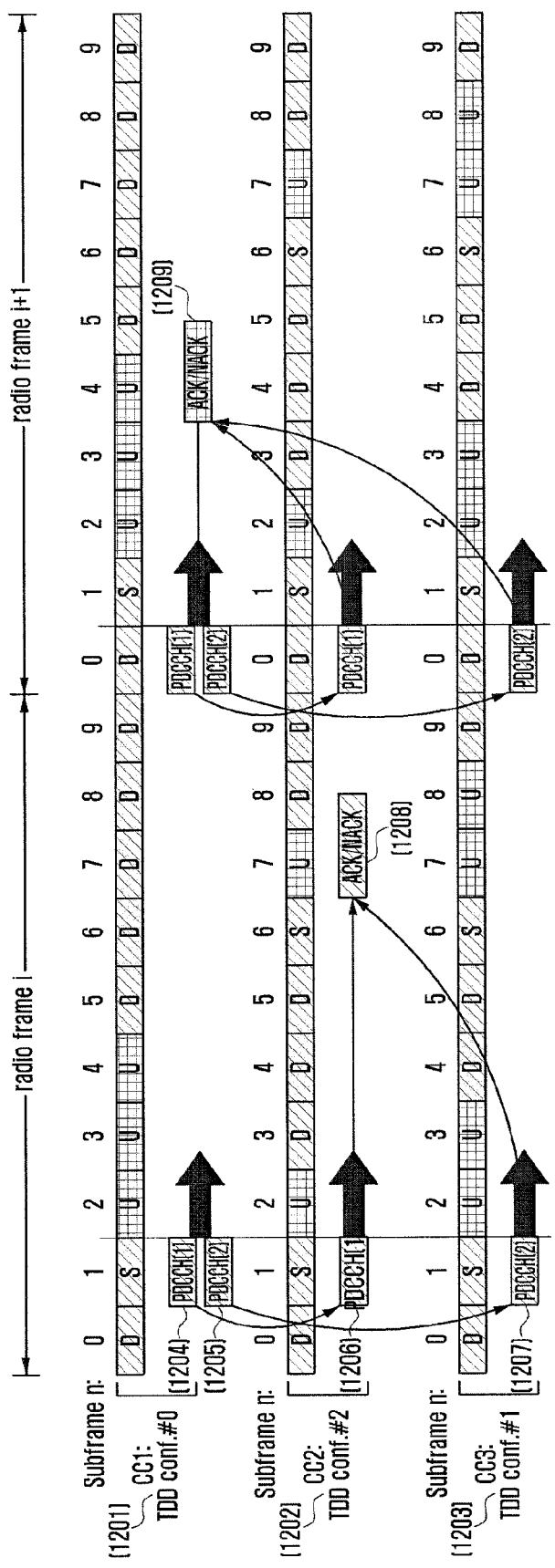
FIG. 12 is a diagram illustrating a channel transmission/reception method according to an exemplary embodiment of the present invention.

FIG. 12 is a diagram illustrating a channel transmission/reception method according to an exemplary embodiment of the present invention.

FIG. 12 shows an exemplary embodiment of the present invention that may relate to a TDD system operating with three aggregated Component Carriers: a Component Carrier CC1 1201 as the primary cell operating in TDD UL-DL configuration #3, a Component Carrier CC2 1202 as a secondary cell operating in TDD UL-DL configuration #2, and a Component Carrier CC3 1203 as a secondary cell operating in TDD UL-DL configuration #1. Although FIG. 12 illustrates an exemplary embodiment of the present invention in which Component Carriers CC2 1202 and CC3 1203 are secondary cells, exemplary embodiments of the present invention can be applied to the cases when the number of Component Carriers configured as secondary cells is greater than or less than 2. Exemplary embodiments of the present invention also can be applied to the communication mode in which the cells sharing the same TDD UL-DL configuration are grouped and cross-carrier scheduled only in the group. Exemplary embodiments of the present invention also can be applied to the case of self-scheduling in which each cell performs scheduling PDSCH transmission on its own.

Referring to FIG. 12, the operation of PDSCH scheduling in the Component Carrier CC1 1201 as primary cell (i.e., non-cross carrier scheduling operation) may be identical with that of the legacy LTE TDD system.

However, the operation for scheduling the PDSCHs of the Component Carriers CC2 1202 and CC3 1203 as secondary cells on the PDCCH of the Component Carrier CC1 1201 of the primary cell (i.e., cross carrier scheduling operation) is not defined for the legacy LTE system and thus it is necessary for the cross carrier scheduling operation to be newly defined. Particularly, it is necessary to define the timing relationship for transmitting the HARQ ACK/NACK for the PDSCH of the secondary cells in a certain cell.

A brief description is made of the timing relationship between PDCCH carrying the cross carrier scheduling information and PDSCH scheduled by the scheduling information.

Referring again to FIG. 12, the eNB is supposed to transmit the PDCCHs 1204 and 1205 for scheduling PDSCHs of the secondary cells CC2 1202 and CC3 1203 in the subframe #1 of the $i^{th}$ radio frame which is configured as downlink subframe in the primary cell CC1 1201. In the above example, because the subframes of the secondary cells CC2 1202 and CC3 1203 are configured as downlink subframes at the same time point, it is possible to perform downlink transmission in the corresponding subframe.

If the PDSCHs 1206 and 1207 are received in the subframe #1 of $i^{th}$ radio frame through the secondary cells CC2 1202 and CC3 1203 respectively, the UE transmits HARQ ACK/NACK 1208 through the cell having the uplink subframe arriving first after 4 subframes since then by comparing the subframes of all the cells configured in the UE among each other. Referring to FIG. 12, because there exists the uplink subframes (i.e., subframe #7 of the CC2 1202 and subframe #7 of the CC3 1203), the UE selects one of the two cells according to a predetermined rule and transmits HARQ ACK/NACK in the selected cell.

For example, an exemplary rule for selecting the cell to transmit HARQ ACK/NACK, when there is no uplink subframe in the primary cell, is to select the cell having a lowest index. As another example, an exemplary rule for selecting the cell to transmit HARQ ACK/NACK, when there is uplink subframe in the primary cell, is to select the uplink subframe of the primary cell. Still another exemplary rule for selecting the cell to transmit HARQ ACK/NACK is to select the cell which the eNB recommends through Radio Resource Control (RRC) signaling or dedicated signaling.

To sum up the UE operation according to an exemplary embodiment of the present invention, the UE receives PDCCH carrying cross carrier scheduling information in a specific cell and transmits HARQ ACK/NACK in the cell having the uplink subframe arriving first after 4 subframe since the PDSCH transmission time point or, if there are multiple cell having the uplink subframes arriving first, in the cell selected according to a predetermined rule. For example, the UE transmits the HARQ ACK/NACK 1209 in CC1 1201 at subframe #4 in radio frame i+1.

Although the description is directed to the exemplary cross carrier scheduling in which PDCCH is transmitted in the first cell and PDSCH in the second cell, exemplary embodiments of the present invention are not limited thereto. If self-scheduling is performed according to an exemplary embodiment of the present invention (i.e., if the PDSCH and PDSCH are transmitted in a cell without CIF configuration), then the UE can transmit HARQ ACK/NACK in the cell having the uplink subframe arriving first after a predetermined number of subframes since the subframe carrying the PDSCH of a specific cell. If there are multiple cells having the uplink subframe arriving first, the UE can select a cell according to a predetermined rule. At this time, if the HARQ ACK/NACKs of multiple cells including the primary cell are transmitted simultaneously, the UE multiplexes the HARQ ACK/NACKs. Finally, the UE transmits the multiplexed HARQ ACK/NACKs in the corresponding subframe. Descriptions are made of the eNB and UE procedures according to such an exemplary embodiment of the present invention hereinafter.

Figure 13:
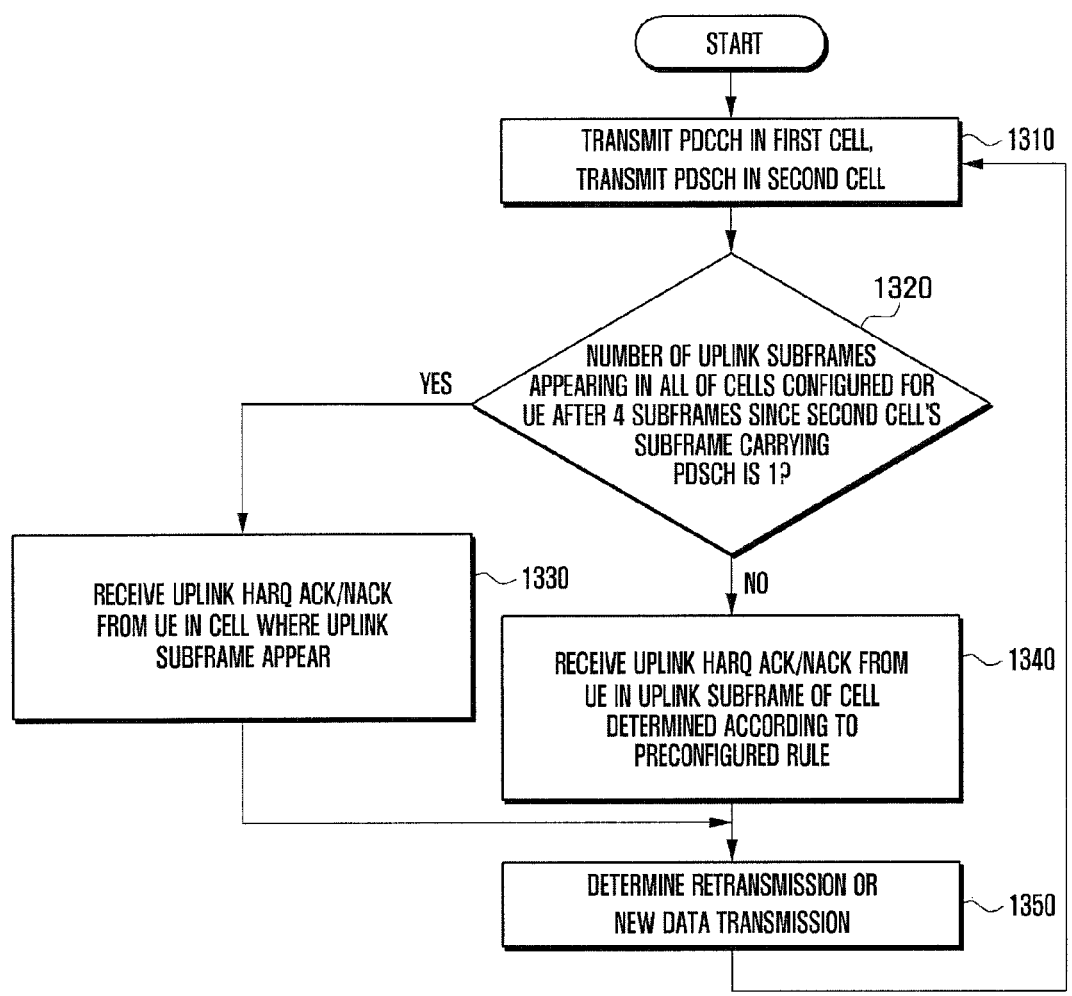
FIG. 13 is a flowchart illustrating an eNB procedure for cross carrier scheduling according to an exemplary embodiment of the present invention.

FIG. 13 is a flowchart illustrating an eNB procedure for cross carrier scheduling according to an exemplary embodiment of the present invention.

Referring to FIG. 13, the eNB generates and transmits PDCCH in the first cell and generates and transmits PDSCH in the second cell at step 1310. The eNB determines whether the number of uplink subframes appearing in all of the cells configured for the UE after 4 subframes since the second cell subframe carrying the PDSCH is 1 at step 1320.

If the number of uplink subframes appearing in all of the cells configured for the UE is 1, then the eNB receives uplink HARQ ACK/NACK transmitted by the UE in the uplink subframe at step 1330. Otherwise, if the number of uplink subframes appearing in all of the cells configured for the UE is greater than 1, then the eNB receives uplink HARQ ACK/NACK transmitted in the uplink subframe of the cell determined according to a predetermined rule at step 1340. Because the rule has been described with reference to FIG. 12, detailed description thereon is omitted.

At step 1350, the eNB performs retransmission of the PDSCH or transmission of new PDSCH according to the received HARQ ACK/NACK received at step 1330 or 1340. In more detail, if the HARQ ACK/NACK is NACK, the eNB retransmits the PDSCH. Otherwise, if the HARQ ACK/NACK is ACK, the eNB transmits new PDSCH. The eNB returns the procedure to step 1310 to determine whether to perform retransmission of the previous PDSCH or transmission of new PDSCH and repeats above-described procedure.

Figure 14:
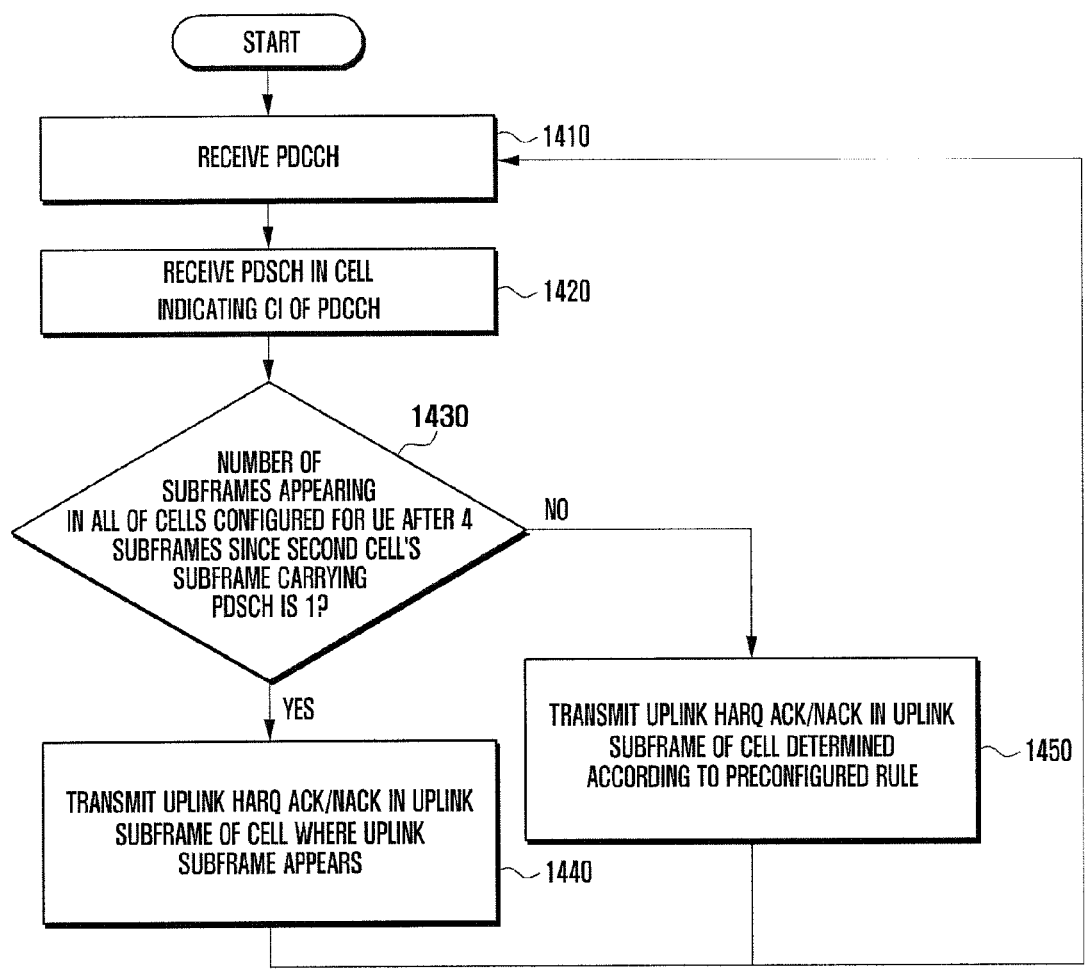
FIG. 14 is a flowchart illustrating an UE procedure for cross carrier scheduling according to an exemplary embodiment of the present invention.

FIG. 14 is a flowchart illustrating an UE procedure for cross carrier scheduling according to an exemplary embodiment of the present invention.

Referring to FIG. 14, the UE receives PDCCH from the eNB at step 1410. At this time, because it is not known when the eNB transmits the PDCCH on which Component Carrier, the UE attempts detecting PDCCH on the Component Carrier configured for PDCCH decoding in every subframe. For this purpose, the UE performs CRC check on the received PDCCH with unique UE ID allocated to itself. If the received PDCCH includes the scheduling addressed to the UE, then the UE receives PDSCH in the cell indicated by the Carrier Cndicator (CI) included in the PDCCH at step 1420.

Next, the UE determines whether the number of subframes appearing in all of the cells configured for the UE after 4 subframes since the second cell subframe carrying the PDSCH is 1 at step 1430. If the number of uplink subframes appearing in all of the cells configured for the UE is 1, then the UE transmits uplink HARQ ACK/NACK in the uplink subframe of the corresponding cell at step 1440.

Otherwise, if the number of uplink subframes appearing in all of the cells configured for the UE is greater than 1, then the UE transmits uplink HARQ ACK/NACK in the uplink subframe of the cell selected according to a predetermined rule at step 1450. Afterward, the UE returns the procedure to step 1410 to prepare the retransmitted PDSCH or newly transmitted PDSCH according the HARQ ACK/NACK received at step 1440 or at step 1450. That is, if the transmitted HARQ ACK/NACK is NACK, the UE prepares for receiving PDSCH retransmission. Otherwise, if the transmitted HARQ ACK/NACK is ACK, the UE prepares for receiving new PDSCH transmission. At this time, if the HARQ ACK/NACKs of multiple cells including the primary cell are transmitted simultaneously, the UE multiplexes the HARQ ACK/NACKs. Finally, the UE transmits the multiplexed HARQ ACK/NACKs in the corresponding subframe.

Figure 15:
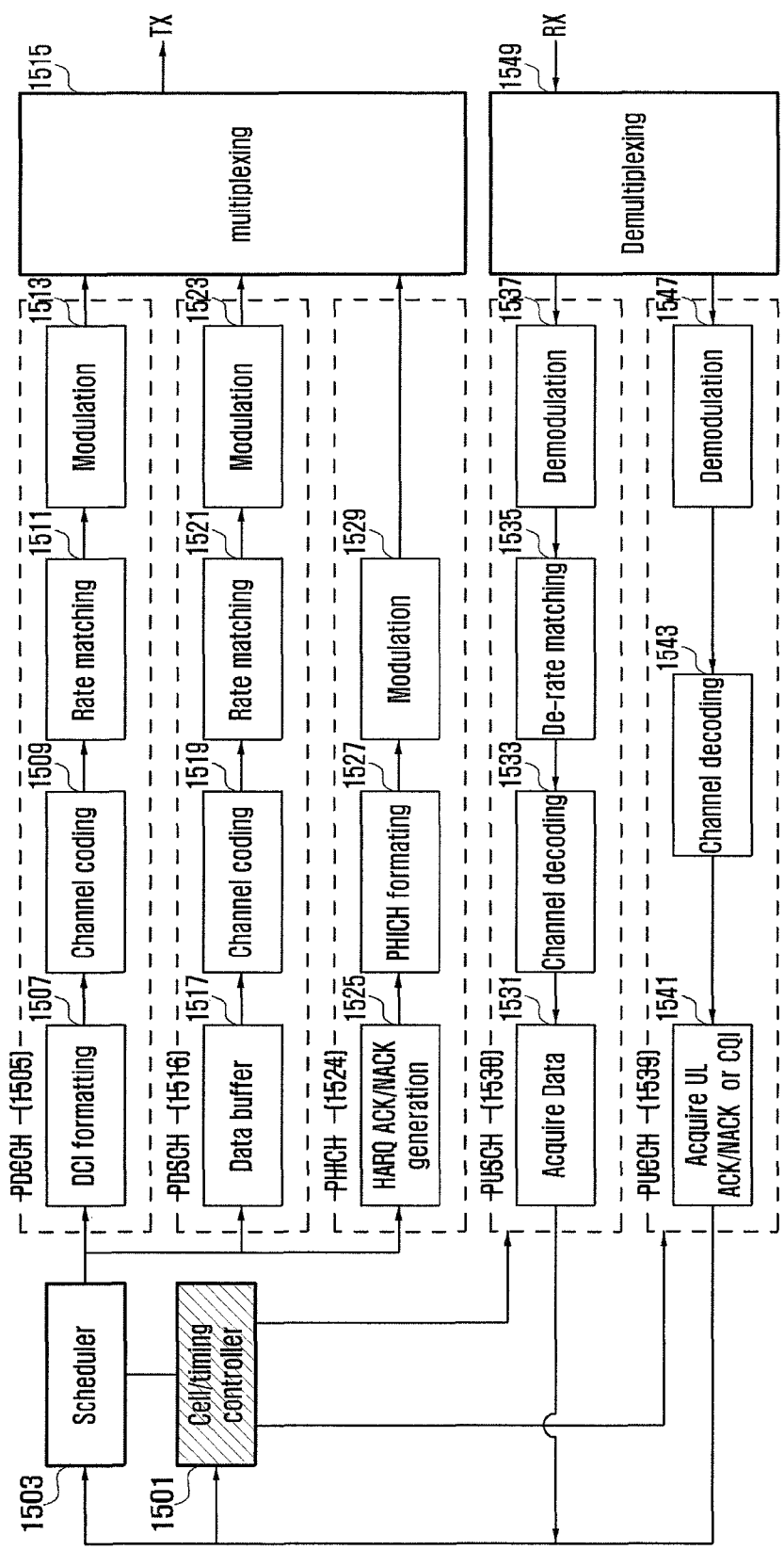
FIG. 15 is a diagram illustrating a configuration of an eNB according to an exemplary embodiment of the present invention.

FIG. 15 is a diagram illustrating a configuration of an eNB according to an exemplary embodiment of the present invention.

Referring to FIG. 15, the eNB comprises a transmitter including a PDCCH block 1505, a PDSCH block 1516, a PSICH block 1524, and a multiplexer 1515; a receiver including a PUSCH block 1530, a PUCCH block 1539, and a demultiplexer 1549; a timing controller 1501, and a scheduler 1503. Although the transmitter and receiver (except for the PUCCH block) can be modified in a configuration depending on the number of Component Carriers aggregated, the description is directed to the configuration having one transmitter and one receiver for simplicity purpose. The PDCCH block 1505 of the transmitter includes a DCI formatter 1507, a channel coder 1509, a rate matcher 1511, and a modulator 1513; and the PDSCH block 1516 includes a data buffer 1517, a channel coder 1519, a rate matcher 1521, and a modulator 1523; the PHICH block 1524 includes an HARQ ACK/NACK generator 1525, a PHICH formatter 1527, and a modulator 1529. The PUSCH block of the receiver includes a demodulator 1537, a derate matcher 1535, a channel coder 1533, a data acquirer 1531; and the PUCCH block includes a demodulator 1547, a channel decoder 1543, and an ACK/NACK or CQI acquirer 1541.

The cell/timing controller 1501 determines the cell selection and timing relationships among the physical channels for the UE scheduled by taking notice of data amount to be transmitted to the UE and resource amount available in the system and notifies the result to the scheduler 1503, the PUSCH block 1530, and a PUCCH block 1539. The cell selection and timing relationship is determined according to the methods described in the exemplary embodiments of the present invention. The PDCCH block 1505 generates a DCI by means of the DCI formatter 1507, adds error correction code to the DCI by means of the channel coder 1509, matches the rate of the channel-coded signal to a predetermined size of resource by means of the rate matcher 1511, modulates the rate-matched signal by means of the modulator 1513, and multiplexes the modulated signal with other signals by means of the multiplexer 1513, under the control of the scheduler 1503.

The PDSCH block 1516 reads out the data to be transmitted from the data buffer 1517, adds error correction code to the data by means of the channel coder 1519, matches the rate of the channel-coded signal to a predetermined size of resource by means of the rate matcher 1521, modulates the rate-matched signal by means of the modulator 1523, and multiplexes the modulated signal with other signals by means of the multiplexer 1515, under the control of the scheduler 1503.

The PHICH block 1524 generates HARQ ACK/NACK for PUSCH received from the UE by means of the HARQ ACK/NACK generator 1525 under the control of the controller 1503. The HARQ ACK/NACK is formatted suitable for the PHICH channel structure by the PHICH formatter 1527, modulated by the modulator 1529, and multiplexed by the multiplexer 1515.

The multiplexed signals are transmitted to the UE in the form of OFDM symbols.

The PUSCH block 1530 of the receiver separates PUSCH from the received signal by means of the demultiplexer 1549, demodulates the PUSCH by means of the demodulator 1537, performs derate matching on the symbols to the state before rate matching by means of the derate matcher 1535, decodes the derate-matched signal by means of the channel decoder 1533, and acquire PUSCH data by means of the data acquirer 1531. The data acquirer 1531 notifies the scheduler 1503 of the decoding result (i.e., whether an error is detected) to adjust downlink HARQ ACK/NACK generation and to the cell/timing controller 1501 to adjust downlink HARQ ACK/NACK transmission timing.

The PUCCH block 1530 separates PUCCH signal from the received signal by means of the demultiplexer 1549, demodulates the PUSCH signal by means of the demodulator 1547, decodes the demodulated signal by means of the channel decoder 1543, and acquires uplink ACK/NACK or CQI by means of the uplink ACK/NACK or CQI acquirer 1541. The acquired uplink ACK/NACK or CQI is provided to the scheduler 1503 so as to be used for determining whether to retransmit PUSCH and modulation and coding scheme (MCS). The acquired uplink ACK/NACK is provided to the carrier aggregation and timing controller 1501 so as to be used for adjusting PDSCH transmission timing.

Figure 16:
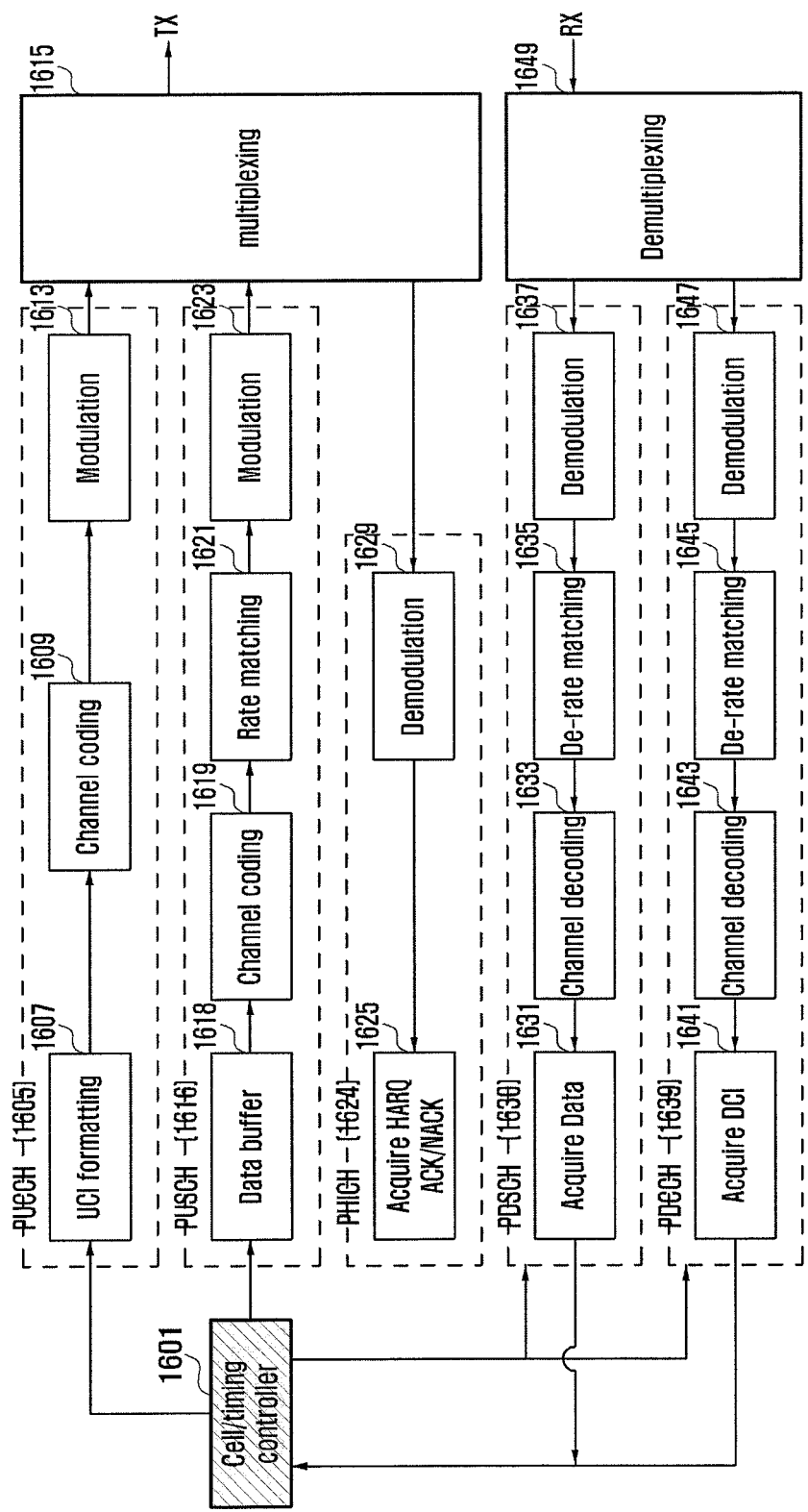
FIG. 16 is a diagram illustrating a configuration of an UE according to an exemplary embodiment of the present invention.

FIG. 16 is a diagram illustrating a configuration of an UE according to an exemplary embodiment of the present invention.

Referring to FIG. 16, the UE comprises a transmitter including a PUCCH block 1605, a PUSCH block 1616, and a multiplexer 1615; a receiver including a PHICH block 1624, a PDSCH block 1630, a PDCCH block 1639, and a demultiplexer 1649; and a cell/timing controller 1601. The PUCCH block 1605 of the transmitter includes a UCI formatter 1607, a channel coder 1619, and a modulator 1613; and the PUSCH block 1616 includes a data buffer 1618, a channel coder 1619, a rate matcher 1621, and a modulator 1623. The PHICH block 1624 of the receiver includes an HARQ ACK/NACK acquirer 1625 and a modulator 1629; and the PDSCH block 1630 includes a demodulator 1637, derate matcher 1635, a channel decoder 1633, and data acquirer 1631; and the PDCCH block 1639 includes a demodulator 1647, a derate matcher 1645, a channel decoder 1643, and a DCI acquirer 1641. Although the transmitter and receiver (except for the PUCCH block) can be modified in a configuration according to the number of carriers aggregated, the description is directed to the configuration having a pair of transmitter and receiver for the sake of simplicity.

The cell/timing controller 1601 adjusts the carrier aggregation condition for the UE based on the DCI received from the eNB, determines the cell for HARQ ACK/NACK transmission and the transmission/reception timing relationship among the physical channels, and notifies the determination result to the PUCCH block 1605, PUSCH block 1616, PHICH block 1624, PDSCH block 1630, and PDCCH block 1639. The cell selection and timing relationship are determined according to the methods of the above-described exemplary embodiments of the present invention.

The PUCCH block 1605 generates HARQ ACK/NACK or CQI as Uplink Control Information (UCI) by means of the UCI formatter 1607 under the control of the cell/timing controller 1601, adds an error correction code to the UCI by means of the channel coder 1609, and modulates the channel coded signal by means of the modulator 1613, and multiplexes the modulated signal with other signals by means of the multiplexer 1615.

The PUSCH block 1616 reads out the data to be transmitted from the data buffer 1618, adds the error correction code to the data by means of the channel coder 1619, matches the rate of the channel-coded signal to a predetermined size of resource by means of the rate matcher 1621, modulates the channel coded signal by means of the modulator 1623, and multiplexes the rate-matched signal with other signals by means of the multiplexer.

The multiplexed signals are transmitted to the eNB in the form of Single Carrier Frequency Division Multiple Access (SC-FDMA) signal.

The PHICH block 1624 of the receiver demultiplexes the signal received from the eNB by means of the multiplexer 1615 to extract PHICH, demodulates the PHICH by means of the demodulator 1629, and acquires HARQ ACK/NACK information from the PUSCH by means of the HARQ ACK/NACK acquirer 1625.

The PDSCH block 1630 demultiplexes the signal received from the eNB by means of the demultiplexer 1649 to extract PDSCH, demodulates the PDSCH by means of the demodulator 1637, recovers the symbols in the state before the rate matching by mans of the derate matcher 1635, decodes the derate-matched signal by means of the channel decoder 1633, and acquires PDSCH data by means of the data acquirer 1631. The data acquirer 1631 notifies the PUCCH block 1605 of the decoding result (i.e. whether an error is detected) to adjust uplink HARQ ACK/NACK generation and notifies the cell/timing controller 1601 to adjust uplink HARQ ACK/NACK transmission timing.

The PDCCH block 1639 demultiplexes the signal received form the eNB by means of the demultiplexer 1649 to extract PDCCH, demodulates the PDCCH by means of the demodulator 1647, decodes the demodulated signal by means of the channel decoder 1633, and acquires DCI by means of the DCI acquirer 1641.

As described above, the channel transmission/reception method according to exemplary embodiments of the present invention is capable of reducing data and control channel transmission/reception errors and transmission delay using a timing relationship among the physical channels for transmitting data and control information in a TDD radio communication system securing broadband bandwidth through carrier aggregation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A hybrid automatic repeat request (HARQ) acknowledgement/negative acknowledgement (ACK/NACK) transmission method of a terminal in a carrier aggregated system, the method comprising:
   receiving scheduling information for a second cell in a first cell;
   receiving data on a Physical Downlink Shared Channel (PDSCH) in the second cell according to the scheduling information;
   identifying a first Time Division Duplex (TDD) Up-Link/Down-Link (UL/DL) configuration corresponding to the first cell and a second TDD UL/DL configuration of corresponding to the second cell; and
   transmitting a first message including HARQ ACK/NACK information associated with the received data using TDD UL/DL configuration #3, if the first TDD UL/DL configuration corresponding to the first cell is identified as TTD UL/DL configuration #3 and the second TDD UL/DL configuration corresponding to the second cell is identified as TTD UL/DL configuration #4.

2. The method of claim 1, further comprising:
   transmitting a second message including the HARQ ACK/NACK of information associated with the received data using TDD UL/DL configuration #2, if the first MD UL/DL configuration corresponding to the first cell is identified as TDD UL/DL configuration #2 and the second TDD UL/DL configuration corresponding to the second cell is identified as TDD UL/DL configuration #0.

3. The method of claim 1, further comprising:
   transmitting a third message including the HARQ ACK/NACK information associated with the received data using TDD UL/DL configuration #2, if the first TDD UL/DL configuration corresponding to the first cell is identified as TDD UL/DL configuration #2 and the second TDD UL/DL configuration corresponding to the second cell is identified as TDD UL/DL configuration #3.

4. The method of claim 1, further comprising:
   transmitting a fourth message including the HARQ ACK/NACK information associated with the received data using TDD UL/DL configuration #2, if the first MD UL/DL configuration corresponding to the first cell is identified as TDD UL/DL configuration #2 and the second TDD UL/DL configuration corresponding to the second cell is identified as TDD UL/DL configuration #6.

5. The method of claim 1, wherein the scheduling information is received on a Physical Downlink Control Channel (PDCCH) in the first cell.

6. A terminal for transmitting a hybrid automatic repeat request (HARQ) acknowledgement/negative acknowledgement (ACK/NACK) in a carrier aggregated system, the terminal comprising:

a control information receiving device configured to receive scheduling information for a second cell in a first cell;

a PDSCH receiving device configured to receive data on a first Physical Downlink Shared Channel (PDSCH) in a first cell and a second PDSCH of the second cell according to the scheduling information;

at least one processor configured to identify a first Time Division Duplex (TDD) Up-Link/Down-Link (UL/DL) configuration corresponding to the first cell and a second TDD UL/DL configuration corresponding to the second cell; and a physical hybrid ARQ indicator channel transmitting device configured to transmit a first message including HARQ ACK/NACK information associated with the received data using TDD UL/DL configuration #3, if the first TDD UL/DL configuration corresponding to the first cell is identified as TDD UL/DL configuration #3, and the second TDD UL/DL configuration corresponding to the second cell is identified as TDD UL/DL configuration #4.

7. The terminal of claim 6, wherein the physical hybrid ARQ indicator channel transmitting device is further configured to transmit a second message including the HARQ ACK/NACK of information associated with the received data using TDD UL/DL configuration #2, if the first MD UL/DL configuration of corresponding to the first cell is identified as TDD UL/DL configuration #2 and the second TDD UL/DL configuration corresponding to the second cell is identified as TDD UL/DL configuration #0.

8. The terminal of claim 6, wherein the physical hybrid ARQ indicator channel transmitting device is further configured to transmit a third message including the HARQ ACK/NACK of information associated with the received data using TDD UL/DL configuration #2, if the first TDD UL/DL configuration corresponding to the first cell is identified as TDD UL/DL configuration #2 and the second TDD UL/DL configuration corresponding to the second cell is identified as TDD UL/DL configuration #3.

9. The terminal of claim 6, wherein the physical hybrid ARQ indicator channel transmitting device is further configured to transmit a fourth message including the HARQ ACK/NACK of information associated with the received data using TDD UL/DL configuration #2, if the first TDD UL/DL configuration corresponding to the first cell is identified as TDD UL/DL configuration #2 and the second TDD UL/DL configuration corresponding to the second cell is identified as TDD UL/DL configuration #6.

10. The terminal of claim 6, wherein the scheduling information is received on a Physical Downlink Control Channel (PDCCH) in the first cell.

11. A hybrid automatic repeat request (HARQ) acknowledgement/negative acknowledgement (ACK/NACK) transmission method of a terminal in a carrier aggregated system, the method comprising:

receiving scheduling information for a second cell in a first cell;

receiving data on a Physical Downlink Shared Channel (PDSCH) in the second cell according to the scheduling information;

identifying a first Time Division Duplex (TDD) Up-Link/Down-Link (UL/DL) configuration corresponding to the first cell and a second TDD UL/DL configuration corresponding to the second cell;

transmitting a first message including HARQ ACK/NACK information associated with the received data using TDD UL/DL configuration #3, if the first TDD UL/DL configuration corresponding to the first cell is identified as TDD UL/DL configuration #3 and the second TDD UL/DL configuration corresponding to the second cell is identified as TDD UL/DL configuration #4;

transmitting a second message including the HARQ ACK/NACK information associated with the received data using TDD UL/DL configuration #2, if the first TDD UL/DL configuration corresponding to the first cell is identified as TDD UL/DL configuration #2, and the second TDD UL/DL configuration corresponding to the second cell is identified as TDD UL/DL configuration #0;

transmitting a third message including the HARQ ACK/NACK information associated with the received data using TDD UL/DL configuration #2, if the first TDD UL/DL configuration corresponding to the first cell is identified as TDD UL/DL configuration #2 and the second TDD UL/DL configuration corresponding to the second cell is identified as TDD UL/DL configuration #3; and transmitting a fourth message including the HARQ ACK/NACK information associated with the received data using TDD UL/DL configuration #2, if the first TDD UL/DL configuration corresponding to the first cell is identified as TDD UL/DL configuration #2 and the second TDD UL/DL configuration corresponding to the second cell is identified as TDD UL/DL configuration #6.

12. The method of claim 11, wherein the scheduling information is received on a Physical Downlink Control Channel (PDCCH) in the first cell.

13. A terminal for transmitting a hybrid automatic repeat request (HARQ) acknowledgement/negative acknowledgement (ACK/NACK) in a carrier aggregated system, the terminal comprising:

a control information receiving device configured to receive scheduling information for a second cell in a first cell;

a PDSCH receiving device configured to receive data on a Physical Downlink Shared Channel (PDSCH) in a first cell and a PDSCH of the second cell according to the scheduling information;

at least one processor configured to identify a first Time Division Duplex (TDD) Up-Link/Down-Link (UL/DL) configuration corresponding to the first cell and a second TDD UL/DL configuration corresponding to the second cell; and a physical hybrid ARQ indicator channel transmitting device configured to—:

transmit a first message including HARQ ACK/NACK information associated with the received data using TDD UL/DL configuration #3, if the first TDD UL/DL configuration corresponding to the first cell is identified as TDD UL/DL configuration #3, and the second TDD UL/DL configuration corresponding to the second cell is identified as TDD UL/DL configuration #4, transmit a second message including the HARQ ACK/NACK information associated with the received data using TDD UL/DL configuration #2, if the first TDD UL/DL configuration corresponding to the first cell is identified as TDD UL/DL configuration #2 and the second TDD UL/DL configuration corresponding to the second cell is identified as TDD UL/DL configuration #0, transmit a third message including the HARQ ACK/NACK f information associated with the received data using TDD UL/DL configuration #2, if the first TDD UL/DL configuration corresponding to the first cell is identified as TDD UL/DL configuration #2 and the second TDD UL/DL configuration corresponding to the second cell is identified as TDD UL/DL configuration #3, and transmit a fourth message including the HARQ ACK/NACK information associated with the received data using TDD UL/DL configuration #2, if the first TDD UL/DL configuration corresponding to the first cell is identified as TDD UL/DL configuration #2 and the second TDD UL/DL configuration corresponding to the second cell is identified as TDD UL/DL configuration #6.

14. The terminal of claim 13, wherein the scheduling information is received on a Physical Downlink Control Channel (PDCCH) in the first cell.

* * * * *